United States Patent [19]

Havins

[11] Patent Number: 4,854,902
[45] Date of Patent: Aug. 8, 1989

[54] BOAT SPEED AND DIRECTION CONTROL SYSTEM

[76] Inventor: Felton H. Havins, 300 N.E. 6th St., Fort Worth, Tex. 76106

[21] Appl. No.: 75,590

[22] Filed: Jul. 20, 1987

Related U.S. Application Data

[63] Continuation-in-part of Ser. No. 853,203, Apr. 17, 1986, Pat. No. 4,723,500.

[51] Int. Cl.$^4$ ............................................. B60L 15/20
[52] U.S. Cl. ...................................... 440/7; 114/144 E
[58] Field of Search .......................... 440/6, 7, 53; 114/144 R, 144 E; 74/478, 480 B, 481, 512, 560

[56] References Cited

U.S. PATENT DOCUMENTS

| | | | |
|---|---|---|---|
| 3,121,415 | 2/1964 | Anderson et al. | 440/87 |
| 3,596,625 | 8/1971 | Guenther | 440/6 |
| 3,598,947 | 8/1971 | Osborn | 440/7 |
| 3,711,755 | 1/1973 | Meyer, Jr. | 440/6 |
| 3,807,345 | 4/1974 | Peterson | 440/7 |
| 3,878,809 | 4/1975 | Ray | 440/6 |
| 3,995,579 | 12/1976 | Childre | 440/7 |
| 4,527,983 | 7/1985 | Booth | 440/7 |
| 4,537,144 | 8/1985 | Horton | 440/7 |

Primary Examiner—Joseph F. Peters, Jr.
Assistant Examiner—Jesús D. Sotelo
Attorney, Agent, or Firm—James C. Fails; Arthur F. Zobal; Geoffrey A. Mantooth

[57] ABSTRACT

There is disclosed a steering control system for a boat propelled by either bow mounted or transom mounted trolling motors. The steering control system includes a steering cam assembly, actuating device for imparting relative rotational movement between the steering cam and the steering cam housing, and steering device for turning the trolling motors in a manner responsive to the actuation of the switching device. The steering cam assembly has a steering cam with actuating surfaces that form varying contours, a steering cam housing that houses the steering cam such that the steering cam rotates relative to the steering cam housing, electrical switching device coupled to the steering cam housing with actuating portions responsive to the actuating surface. Several different embodiments of the steering device are provided that either swing the trolling motors in an arc or rotate the trolling motors. In this continuation-in-part application there is disclosed a speed and direction control system in which there are a controller having a steering assembly with rotatable members and a speed assembly located within the steering assembly, electrical circuits for controlling speed and direction, portions of which are located within the controller, and trolling motor mounting apparatuses for turning the trolling motors for directional control. One type of mounting apparatus utilizes differential thrust outputs of several trolling motors, while another type of mounting apparatus utilizes a steering motor to turn trolling motors.

42 Claims, 18 Drawing Sheets

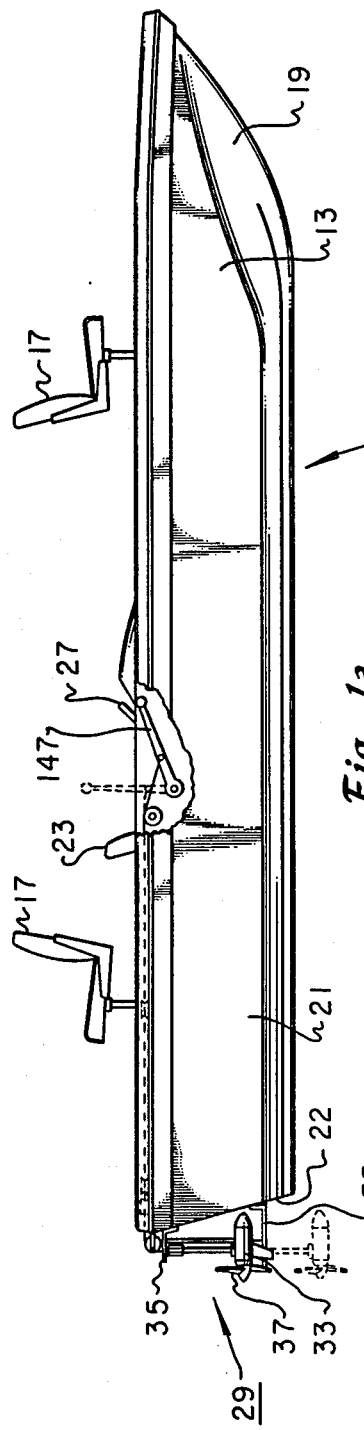

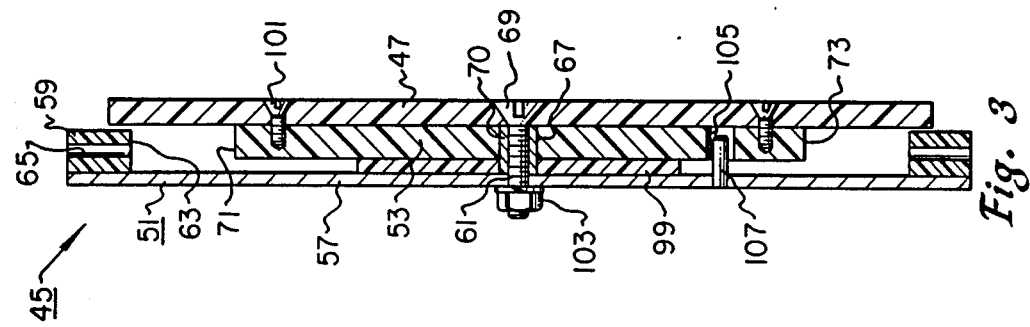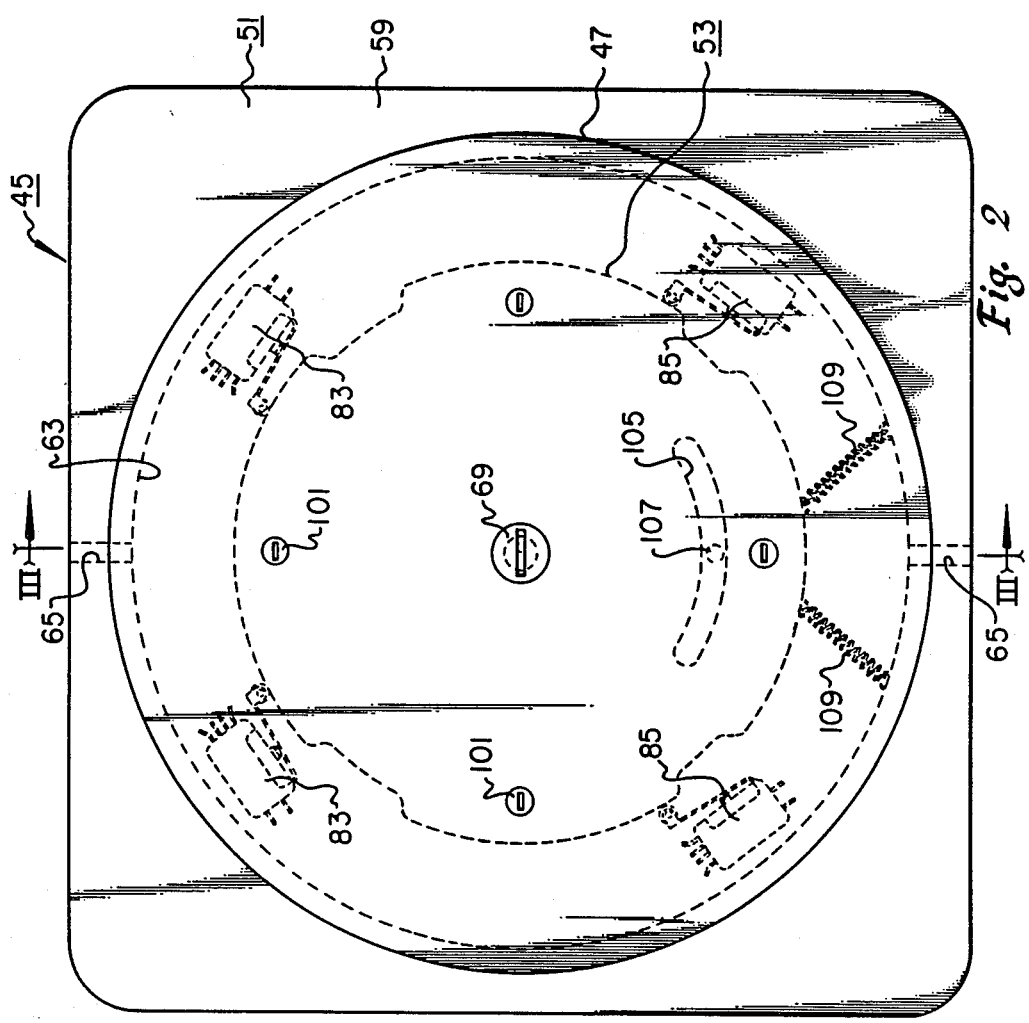

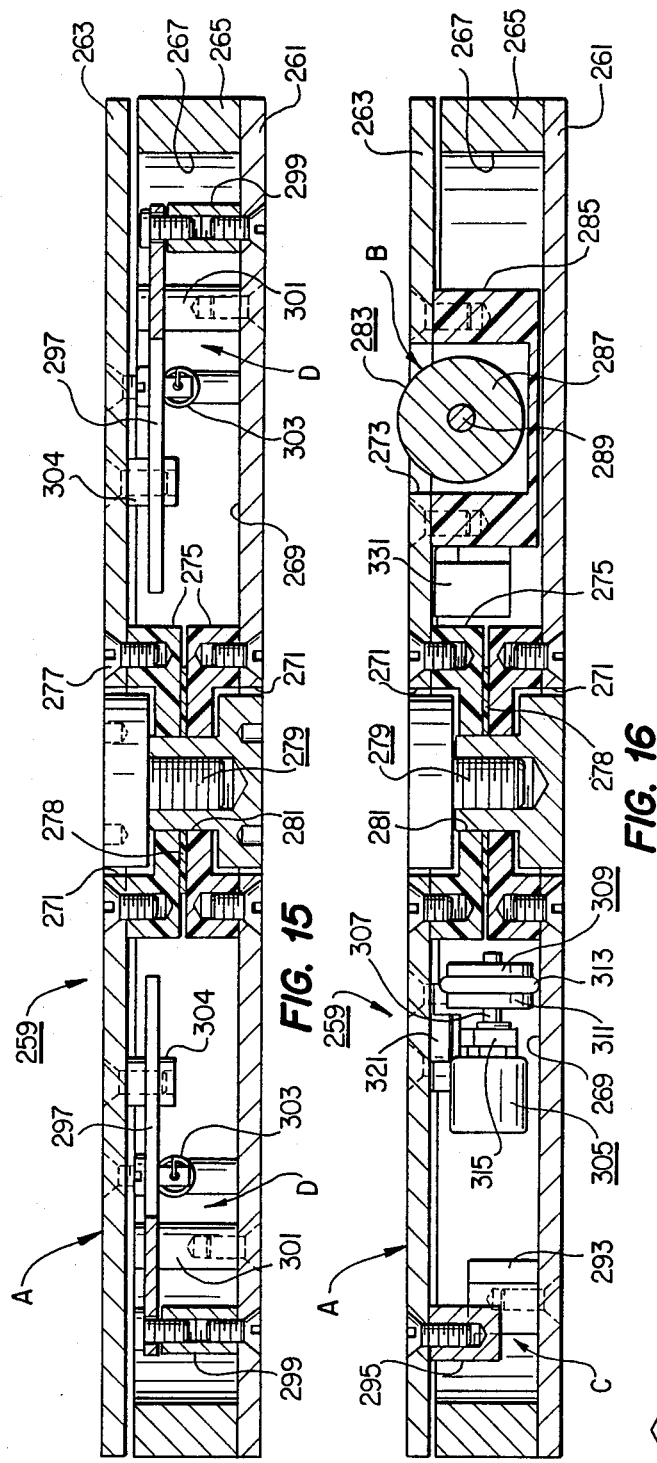

BOAT SPEED AND DIRECTION CONTROL SYSTEM

This application is a continuation-in-part of my co-pending application, Ser. No. 06/853,203, filed Apr. 17, 1986, now U.S. Pat. No. 4,723,500.

FIELD OF THE INVENTION

The present invention relates to systems for controlling the speed and direction of self-propelled watercraft, particularly those types of watercraft that are used for recreational purposes.

BACKGROUND OF THE INVENTION

Fishing boats commonly come equipped with secondary propulsion means that supplement the primary or main propulsion motor. The secondary propulsion means propels the boat more quietly and at a much lower speed than the noisy internal combustion main motor. The secondary propulsion means includes one or more submergible portions, which provide propulsive thrust, and mounting portions for mounting each submergible portion to the boat.

Typically the secondary propulsion means submergible portion includes an electric trolling motor, and the mounting portion includes a mounting bracket. The trolling motor depends from a vertical shaft which is coupled to the boat by the mounting bracket. The vertical shaft is supported by the mounting bracket in such a way that rotation of the shaft around its vertical or longitudinal axis is permitted.

A prior art speed and direction control for trolling motors commonly in use consists of a short horizontal steering bar coupled to the vertical shaft in such a manner that the steering bar extends inwardly towards the boat. Steering is accomplished by moving the steering bar from side to side causing the vertical shaft to rotate around its longitudinal axis and turn the trolling motor to change the direction of propulsive thrust. The speed control may be either on the motor or on the steering bar.

On fishing boats having pedestal mounted seats in the bow and stern areas, the steering bar is located inconveniently far away from the seats. In addition, the steering bar is most effectively operated by hand. Thus, the inconvenience becomes even greater because the fisherman is using both of his hands to cast and to reel as the boat is slowly propelled through the water. To steer the boat while fishing, the fisherman must stop casting and reeling, and lean over to the steering controls.

Another type of speed and direction control in the prior art allows control from a position that is remote from the trolling motor. The steering control consists of a foot pedal mounted on a fulcrum that enables the pedal to rock back and forth in a seesaw-like fashion, actuating cables to turn the trolling motor. The speed control is a small knob located on the side of the foot pedal which can be rotated.

It is an object of the present invention to provide a speed and direction control system for a boat that may be operated without the use of the hands.

Another object of the present invention is to provide a speed and direction control system with controls that may be located on a boat in a position that makes operation convenient.

This continuation-in-part application is directed to further developments concerning boat control systems, which developments were not discussed in my original or parent application. In this application there are disclosed developments pertaining to a controller for use by a boat operator in controlling the speed and direction of a boat, a differential steering type mounting means for mounting two trolling motors to a boat such that the orientation of the trolling motors is varied to affect boat steering in response to the differential thrust outputs of the trolling motors, and a motorized steering type mounting means for mounting one or more trolling motors to a boat such that boat steering is affected by a motor means which rotates the trolling motor so as to vary the orientation of the trolling motor. FIGS. 13-27 of the drawings pertain particularly to the subject matter of this continuation-in-part application.

BRIEF DESCRIPTION OF THE DRAWINGS

FIG. 1a is a schematic side view showing a fishing boat incorporating an installation of apparatus for raising and lowering trolling motors, in accordance with a preferred embodiment.

FIG. 1b is a schematic plan view of the boat of FIG. 1a incorporating an installation of the steering control system of the present invention, in accordance with a preferred embodiment.

FIG. 2 is a schematic plan view of the steering cam assembly.

FIG. 3 is a schematic vertical section view of FIG. 2 taken at lines III—III.

FIG. 7 is a schematic closeup view of the control lever for the raising and lowering apparatus of FIG. 1a.

FIG. 15 is a schematic vertical section view of the controller of FIG. 14 taken at lines XV—XV.

FIG. 16 is a schematic vertical section view of the controller of FIG. 14 taken at lines XVI—XVI.

FIG. 17 is a schematic vertical section view of the controller of FIG. 14 taken at lines XVII—XVII.

FIG. 17a is a schematic isometric view of the spring shown in FIG. 17.

FIG. 18 is a schematic vertical section view of the controller of FIG. 14 taken at lines XVIII—XVIII.

FIG. 18a is a schematic isometric view of the spring shown in FIG. 18.

DESCRIPTION OF PREFERRED EMBODIMENTS

Figure 4:
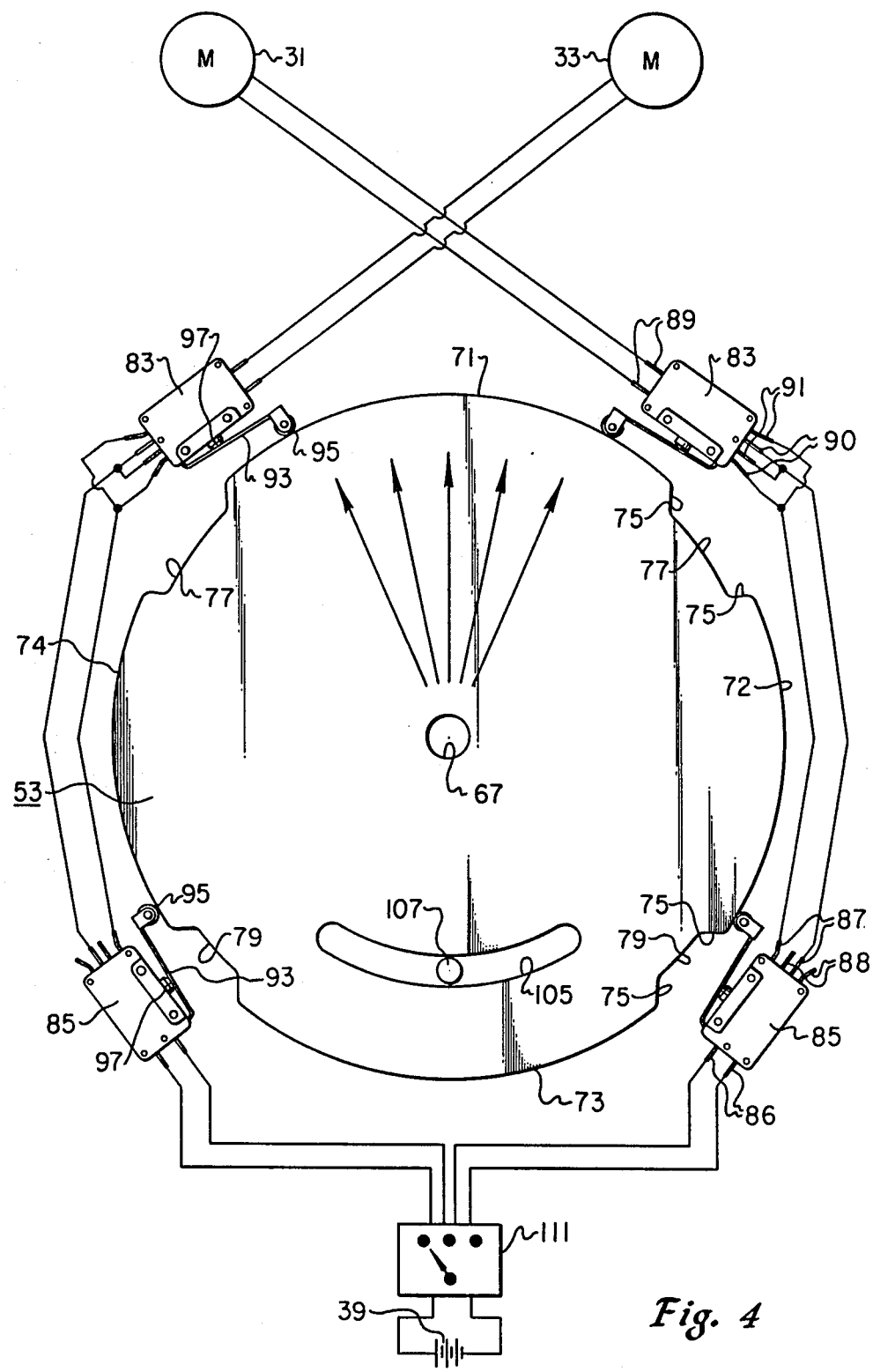
FIG. 4 is an electrical schematic view of the steering control system of the present invention, in accordance with a preferred embodiment.

In FIGS. 1a and 1b there are shown side and plan views of a typical fishing boat 11 in which a steering control system of the present invention, in accordance with a preferred embodiment, has been installed. There is shown the boat hull 13 and the boat deck 15. Fishing seats 17, mounted on pedestals several feet off of the deck 15 and capable of rotating 360°, are located in the bow and stern portions 19, 21, of the boat. The boat is equipped with primary and secondary propulsion means. The primary propulsion means is typically a large internal combustion engine (not shown) located on the stern portion 22 of the boat. The primary engine may be either an outboard type or an inboard type, although in a boat such as is illustrated, an outboard engine would be the type most commonly used. A driver's seat 23 is mounted to the deck 15 on the right or starboard side of the boat 11. Throttle and directional controls 25, 27 for the primary engine are accessible from the driver's seat 23.

The secondary propulsion means 29 is electrical in nature and includes portions 31, 33 that are submergible and thus can operate in an underwater environment, and mounting portions 35. In the illustrated embodiment, the submergible portions are left and right hand trolling motors 31, 33 and the mounting portions are mounting brackets 35. The trolling motors 31, 33 have a streamlined shape so as to present a minimal amount of resistance to the water as the trolling motors travel through the water. A propeller 37 provides propulsive thrust in a direction coaxial to the longitudinal axis of each trolling motor. The trolling motors are fixed to the transom 22 of the boat hull 13 by the mounting brackets 35. In order to simplify steering, there are an equal number of trolling motors on each side of the boat keel and the trolling motors are located equal distances from the keel.

The boat also has means for energizing the electrical systems on board including the trolling motors and steering control system. In the preferred embodiment, the means for energizing the electrical systems is one or more batteries 39.

The steering control system of the present invention in accordance with a preferred embodiment, with reference to FIGS. 2–7, will now be described. This embodiment is sometimes hereinafter referred to as the swing arm embodiment. The steering control system may be said to include a steering cam assembly 45, actuating means 47, and steering means 49 for changing the orientation of the trolling motors relative to the boat hull.

The steering cam assembly 45 includes first and second members and electrical switching means (see FIGS. 2 and 3). In the preferred embodiments, the first and second members are a steering cam 53 and a steering cam housing 51, respectively. The steering cam housing 51 has a thin bottom plate 57 and a thicker center plate 59 of equal circumferential dimensions. Both plates are penetrated by circular holes that are centrally located; the bottom plate has a small hole 61 for receiving a bolt 69 and the center plate has a much larger hole 63 for the creation of a cylindrical cavity. The cylindrical cavity, having the bottom plate 57 as a bottom wall and the center plate 59 as a side wall, is formed when the center plate is affixed to the bottom plate by screws (not shown) such that the two holes, 61, 63 are coaxial. The cavity is of suitable depth and width to receive the generally cylindrical steering cam 53 and the electrical switching means. Small transverse wireways 65 in the center plate 59 allow communication between the cavity and the outside of the steering cam housing. The steering cam 53 has a centrally placed hole 67 extending therethrough for receiving the bolt 69 and a bushing 70. The circumference of the steering cam 53 has actuating surfaces that form varying contours. Referring now in particular to FIG. 4, it can be seen that the actuating surfaces fall into two general catagories of non-indented surfaces and indented surfaces. The non-idented surfaces are the circumferential surfaces 71, 72, 73, and 74 normally found on a cylindrical object. These circumferential surfaces are not continuous with one another however, as in the case of a cylinder, because of the indented surfaces that are interposed therebetween. Thus, there are first, second, third, and fourth circumferential surfaces 71, 72, 73 and 74. The indented surfaces include transitional surfaces 75, polarity control surfaces 77, and magnitude control surfaces 79. Each end of the circumferential surfaces 71, 72, 73, and 74 merge with the transitional surfaces 75 which in turn then merge with either a polarity control surface 77 or a magnitude control surface 79. In order to provide for the control of the magnitude of the trolling motors, there is provided a magnitude control surface 79 for each side of the boat. Thus there is a left hand magnitude control surface and a right hand magnitude control surface. The same provision is made for the polarity control surfaces 77.

The electrical switching means include, in the preferred embodiments, commercially available conventional switch packages, 83, 85 wired together in such a manner so as to control the energy provided to the individual trolling motors 31, 33. Each switch package has two single-pole, double-throw switches located inside (not shown), the associated electrical contacts and an actuating portion. The magnitude switch packages 85 have a common contact 86, a first contact 87, and a second contact 88 for each switch. The common contact 86 alternates in being connected to either the first contact 87 or the second contact 88. The actuating portion includes an arm 93 that is attached to the switch package at one end and has a roller 95 at the other end. The arm 93 pivots in and out from the switch package about its attached end alternately depressing and releasing a spring loaded button 97. As the arm 93 releases the button 97, both of the switches inside of the switch package are thrown from the set of first contacts 87 to the set of second contacts 88. This action breaks the connection between the common contacts 86 and the first contacts 87 and makes the connection between the common contacts 86 and the second contacts 88. The polarity switch packages 83 also have sets of common contacts 89, first contacts 90, and second contacts 91. A switch package is provided for each of the polarity control surfaces and the magnitude control surfaces. Therefore, there are two polarity control switch packages 83 and two magnitude switch packages 85.

To assemble the steering cam assembly 45 of the swing arm embodiment of the present invention, the steering cam 53 is placed inside of the cavity of the steering cam housing 51, atop a large flat washer 99 which acts as a flat bearing such that the steering cam hole 67 is aligned with the bottom plate hole 61 (see FIGS. 2 and 3). The cylindrical bushing 71 is then inserted into the steering cam hole 67 and the washer 99. Next the switch packages 83, 85 are affixed to the steering cam housing bottom plate 57 by conventional methods after being positioned inside of the cavity and adjacent to the steering cam 53 such that the switch package rollers 95 contact the steering cam circumferential surfaces 71, 72, 74 as shown in FIG. 2 and the arms 93 depress the respective buttons 97. The switch packages 83, 85 are, however, placed sufficiently far away from the steering cam 53 so that as the steering cam is rotated and the rollers contact the control surfaces 77, 79, the arms 93 release the buttons 97. The positioning of the rollers on the appropriate circumferential surfaces determines the sequencing of control signals derived from the battery supply and as applied to the individual trolling motors. The rollers 95 for the two polarity switch packages 83 are located on the first circumferential surface 71 which lies between the polarity control surfaces 77. The rollers for the two magnitude switch packages 85 are located on the second and fourth circumferential surfaces 72, 74. Also, the distance between the rollers of the magnitude switch packages 85 and the magnitude control surfaces 79 is less than the distance between the rollers of the polarity switch packages 83 and the polarity control surfaces 77. These distances insure that as the steering cam 53 is rotated, a magnitude switch package 85 will actuate before a polarity switch package 83. The switch packages are wired together in a configuration to be described in greater detail hereinafter. The wires are then passed through the appropriate wireways 65.

In addition to the components listed above, there is provided actuating means for imparting relative rotational movement between the steering cam 53 and the steering cam housing 51, which in the preferred embodiments, is a top plate 47 of circular dimension. The top plate 47, which has a centrally located bore for receiving the bolt, is large enough to cover the open end of the cavity of the steering cam housing 51 and is coupled to the top surface of the steering cam 53 by screws 101. As a final step to assembling the steering cam assembly 45, the bolt 69 is inserted into the central hole of the top plate 47 and into the bushing 70, and is then secured with a nut 103 on the bottom surface of the bottom plate 57. The steering cam 53 is unitary with the top plate 47 and thus rotates whenever the top plate is turned.

The steering cam assembly is provided means for limiting the relative rotational distance traversed between the steering cam 53 and the steering cam housing 51 to a predetermined angular range, which in the preferred embodiments include a groove 105 in the bottom surface of the steering cam and a peg 107 extending upwardly from the bottom plate into the groove (see FIGS. 2 and 3). The groove 105, having the shape of a circular arc, is concentrically located on the steering cam so that as the steering cam is rotated, the peg 107 stays within the groove. The arcuate length of the groove 105 is determined by the rotational limitation desired. In the preferred embodiments, the groove 105 is short enough to prevent the switch package rollers 95 from engaging any unintended control surfaces 77, 79. Since the steering cam 53 is meant to turn both clockwise and counter-clockwise, the peg 107 should be centered between the two ends of the groove 105 when the steering cam is positioned to steer straight ahead.

The steering cam assembly is further provided a means for realigning the steering cam 53 relative to the steering cam housing 51 to a pre-actuation alignment, after the top plate 47 has been actuated. The pre-actuation alignment is the alignment of the steering cam 53 that steers the boat straight ahead. In the preferred embodiments, the realignment means includes a springs 109 having one end attached to the center plate 59 and the other end attached to the steering cam 53. The spring 109 is of a short enough length so that any rotation of the steering cam from the pre-actuation alignment will stretch the spring.

Referring to FIG. 4, the electrical configuration will now be discussed. A conventional three position switch 111 (ON-OFF-REVERSE) controls the magnitude and polarity of the energy supplied by the battery 39 to both trolling motors 31, 33 simultaneously, while the switch packages 83, 85 control the magnitude and polarity of the energy supplied by the battery to the trolling motors individually. The outputs from the three position switch 111 are connected to the common contacts 86 of the respective magnitude switch packages 85. As viewed in FIG. 4, the right hand polarity switch package and the right hand magnitude switch package control the left hand trolling motor 31. Likewise, the left hand switch packages control the right hand trolling motor 33. Since the left hand connections are a mirror image of the right hand connections, only the right hand connections will be discussed. The first contact 87 from each switch of the magnitude switch package 85 is then connected to a first contact of one switch of the polarity switch package 83 and also to a second contact of the other switch inside of the polarity switch package. Then, the common contacts 89 of the polarity switch package 83 are connected to the left hand trolling motor 31.

Figure 5:
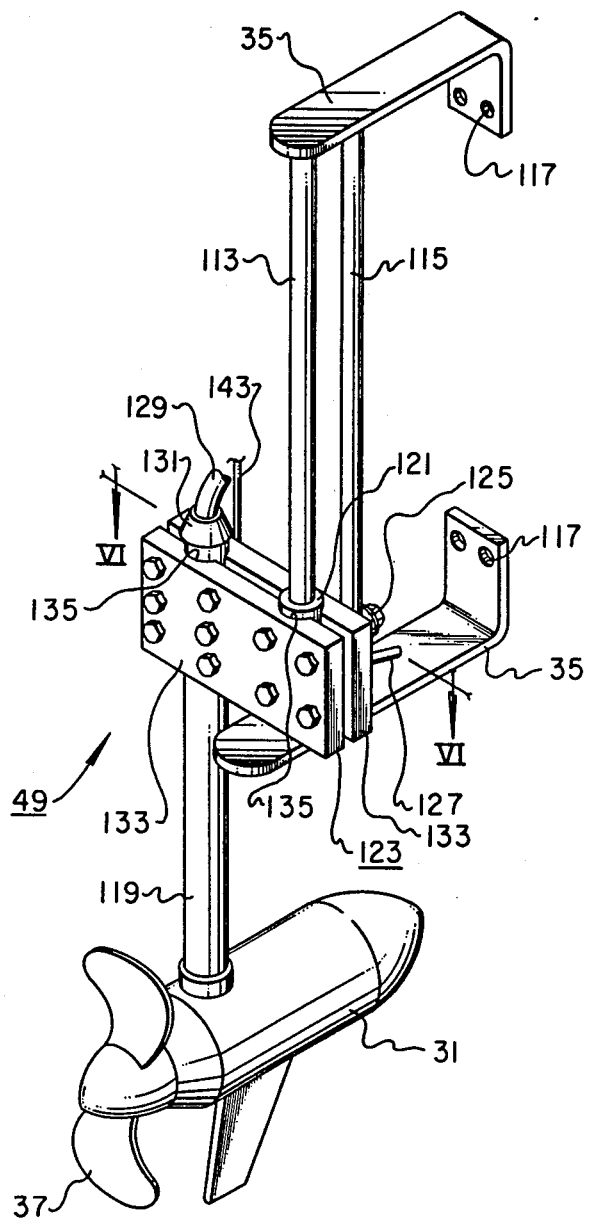
FIG. 5 is a schematic isometric view of a trolling motor and steering means in accordance with a preferred embodiment.
Figure 7:
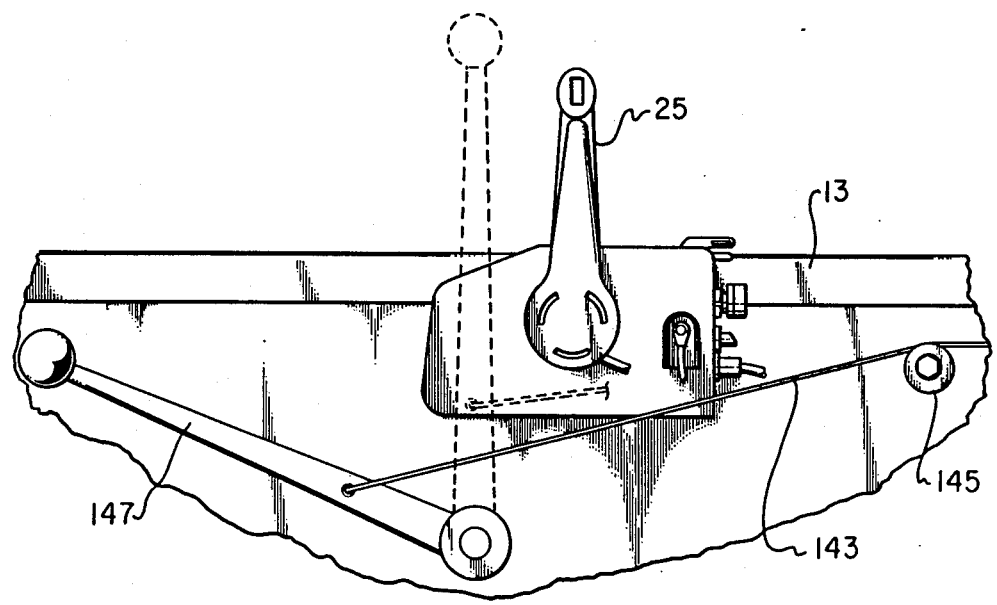
Figure 6:
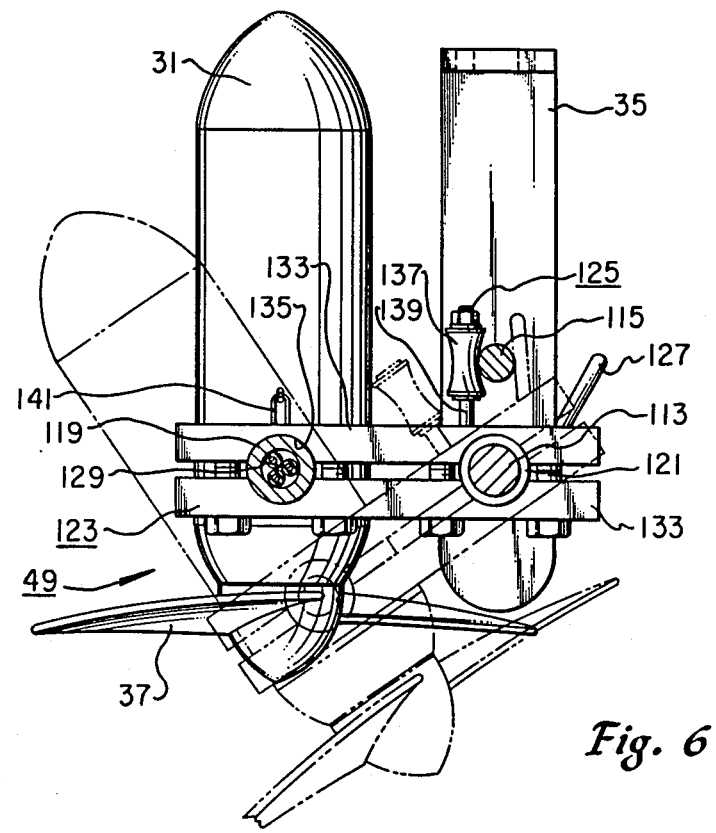
FIG. 6 is a schematic horizontal section view of the motor and steering means of FIG. 5, taken at lines VI—VI.

Referring to FIGS. 5 and 6, the steering means, in accordance with the swing arm embodiment will now be described. The steering means couples the trolling motors 31, 33 to the mounting portions. For each mounting portion there are two mounting brackets 35, an upper bracket and a lower bracket, which are connected together by a pivot rod 113 and an alignment rod 115. The pivot rod 113 is parallel to the alignment rod 115. The inner ends of the mounting brackets are bent toward each other for mounting onto the transom 22. Mounting the brackets to the hull is facilitated by bolt holes 117.

In the swing arm embodiment, the steering means for each trolling motor includes a shaft 119, a sleeve 121, a swing arm 123, alignment means 125, and stop means 127. The shaft 119 has two ends, an upper end and a lower end. The lower end is connected to the upper portion of the trolling motor 31 in a watertight manner. The shaft is hollow thereby allowing the passage of electrical conductors 129 from the steering cam assembly 45 to the trolling motor 31. The upper end of the shaft 119 is sealed with silicone 131 to insure the watertight integrity of the shaft. The nylon sleeve 121 is fitted around the pivot rod 113 to both slide along and rotate around the pivot rod. The swing arm 123 includes two rectangular plates 133 of equal dimensions. The rectangular plates have an inner surface and an outer surface. Two parallel channels 135, which are respectively shaped to conform to fit around portions of the shaft 119 and the sleeve 121, are cut across the minor dimension of the inside surface and near the ends of each plate. The two plates 133 are bolted together to form the swing arm 123 such that the upper end portion of the shaft 119 and the sleeve 121 are held firmly in place in the channels 135 and the shaft and the sleeve are unable to rotate independently of the swing arm.

The swing arm 123 allows changes in the orientation of the trolling motor 31 by having the trolling motor swing along a circular arc such that the longitudinal axis of the trolling motor is kept tangential to the arc. The change in orientation is precipitated by the amount and direction of thrust provided by the trolling motor 31.

The alignment means 125 aligns the trolling motor in an aligned position whenever the trolling motor produces forward thrust. The trolling motor 31 is in the aligned position when the longitudinal axis of the trolling motor is parallel to the boat keel. In the swing arm embodiment, the alignment means includes a concave roller 137 mounted on a pin 139 that extends perpendicularly from the forwardmost swing arm plate 133 and engages the alignment rod 115 whenever the trolling motor is in the alignment position. The concave roller 137 is located on the trolling motor side of the alignment rod 115.

The stop means 127 prevents the trolling motor 31 from swinging past a predetermined position whenever the trolling motor produces zero thrust or reverse thrust. In the swing arm embodiment, the stop means includes a pin 127 that protrudes at about a 45° angle from the forwardmost swing arm plate 133. The stop pin is located on the plate so as to contact the alignment rod 115 when the longitudinal axis of the trolling motor is about 45° from the boat keel.

There is also provided a means for raising and lowering the trolling motors, between a submerged position and an unsubmerged position by remote methods which will now be described (see FIGS. 1a, 1b, 5–7). On the forwardmost plate 133 of the swing arm is an eye 141, to which a cable 143 is attached. The cable 143 traverses upwardly through a series of pulleys 145, joins a second cable from the starboard swing arm, and finally connects to a control lever 147 located to the right of the driver's seat 23. As the control lever 147 is moved forward, the cable 143 tension tightens and simultaneously raises the two swing arms and trolling motors 31, 33 to an unsubmerged position. The sleeves 121 allow the swing arms 125 to travel along the pivot rods 113. As the control lever 147 is moved aft, the cable slackens and the trolling motors 31, 33 are lowered to a submerged position. The control lever 147 is positioned relative to the main motor throttle 25 such that when the control lever is in the aft position, the throttle is prevented from going forward. This mechanical lockout prevents the operation of the main motor while the trolling motors are lowered, and thus minimizes damages to the trolling motors.

The operation of the swing arm embodiment of the present invention will now be described. The steering cam assembly 45 is positioned in a convenient location on the boat so that a boat operator can steer the boat by operating the actuating means. Since the steering cam assembly 45 may be actuated with the foot, a convenient location is likely to be on the boat deck 15, just in front of the bow fishing seat 17 (see FIG. 1b). After the trolling motors 31, 33 have been lowered by the control lever 147, the boat 11 is propelled by the forward thrust of the trolling motors in a straight forwardly direction whenever the steering cam 53 is positioned as shown in FIG. 4 and the three position switch 11 is set to "ON". When the boat operator wants to make a shallow left hand turn, he places his foot on the top plate 47 and rotates the top plate counterclockwise for a short distance. As the top plate 47 and the steering cam 53 rotate, the roller for the right hand magnitude switch package 85 will follow the adjacent transitional surface 75 to the magnitude control surface 79 and the actuating arm 93 will allow the button 97 to release, whereupon the battery 39 will be disconnected from the left hand trolling motor 31. The left hand trolling motor 31 immediately stops producing forward thrust and assumes the condition of producing zero thrust. In this inactive state, the left hand trolling motor 31 acts to produce drag. The drag swings the left hand trolling motor 31 to a position where the longitudinal axis of the trolling motor is no longer parallel to the keel of the boat (see FIG. 6), thus further increasing drag. This position is determined by the stop pin 127 which contacts the alignment rod 115. All during this short period of time, the right hand trolling motor 33 continues to produce forward thrust. The drag of the left hand trolling motor on the left hand portion of the stern causes the bow of the boat to swing to the left. When the boat has turned sufficiently far enough to the left, the boat operator can simply remove his foot from the top plate 47 and the steering cam 53 will be returned, by the spring 109, to the preactuation position. The battery supply is reconnected to the left hand trolling motor in this steering cam position. The left hand trolling motor commences producing forward thrust and swings itself back into alignment with the boat keel. Any trolling motor realignment overshoot is eliminated by the concave roller 137 contacting the alignment rod 115.

The boat operator can obtain a sharper turn to the left by rotating the top plate 47 counterclockwise to the maximum extent. The steering cam housing peg 107 in the steering cam groove 105 determines the maximum extent of rotation. The initial sequence of events is the same as for a shallow turn; the battery 39 is disconnected from the left hand trolling motor 31. However, as the steering cam 53 continues to rotate, the roller for the right hand polarity switch package 83 will follow the adjacent transitional surface to the polarity control surface 77. The switches inside of the polarity switch package 83 reverse the polarity of the battery supply 39 as applied to the left hand trolling motor 31. As the steering cam 53 completes its rotation, the roller for the right hand magnitude switch package 85 follows the other transitional surface onto the third circumferential surface 73. The battery 39 is once again connected to the left hand trolling motor 31 but with reverse polarity. This has the effect of producing reverse thrust which quickens the left turn. Allowing the steering cam 53 to return to its preactuation position causes the left hand trolling motor 31 to produce forward thrust, after a brief period of time of producing zero thrust to change back to the original polarity.

The previously described embodiment of the electrical switching means has great utility for small trolling motors. For trolling motors having current ratings in excess of 10 amperes, an alternate embodiment of the electrical switching means is provided to protect the switching packages 83, 85 from overcurrent conditions (see FIG. 8). Electrical connections between the battery supply 39, the three position switch 111, and the magnitude switch packages 85 are the same as described above. However, the magnitude switch package first contacts 87 are connected to the polarity switch package common contacts 89. The polarity switch package first contacts 90 are connected to the coil of a first relay 149 and the polarity switch package second contacts 91 are connected to a coil of a second relay 151. The relay coils control double-pole, double-throw switches which are connected in parallel to one another between a heavy duty battery supply 153 and the trolling motors 31, 33. The double-pole, double-throw switches of the first and second relays are connected across the heavy duty battery supply 153 in such a manner that the battery supply polarity obtained by the left hand trolling motor 31 through the first relay 149 is reversed from the battery supply polarity obtained through the second relay 151.

Figure 8:
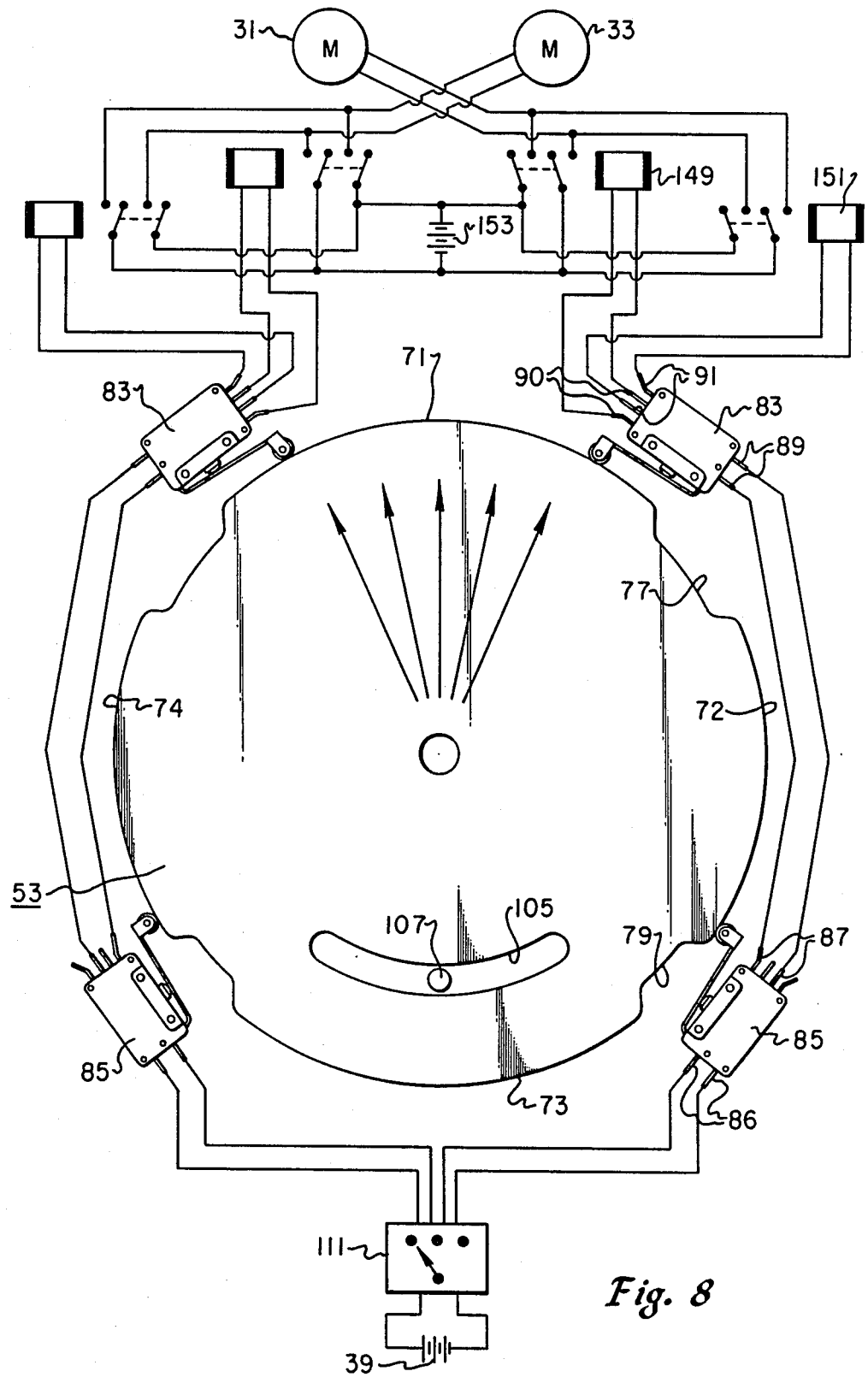
FIG. 8 is an electrical schematic view of the steering control system of the present invention, in accordance with another preferred embodiment.

The operation of the steering control system of the present invention, in accordance with the embodiment illustrated in FIG. 8, is, from the boat operators point of view, the same as the operation of the previously described embodiments of FIG. 4. Electrically, however, the polarity switch packages 83 and the magnitude switch packages 85 no longer directly control the trolling motors 31, 33. Instead, control is indirectly provided through the relays 149, 151. When the right hand magnitude switch package 85 is actuated for a shallow left turn, the battery supply 39 is disconnected from the coil of the first relay 149, thus disconnecting heavy duty battery supply 153 from the left hand trolling motor 31. For a sharper left turn, the right hand polarity switch package 83 is actuated after the battery supply 39 is disconnected through the right hand magnitude switch package 85. When the battery supply 39 is again reconnected by the right hand magnitude switch package 85, because the roller is now contacting the third circumferential surface 73, the right hand polarity switch package 83 energizes the coil of the second relay 151 which connects the heavy duty battery supply 153 to the left hand trolling motor 31 but with a reversed polarity. The left hand trolling motor is mounted to the boat 11 via the swing arm 123 and performs as previously described.

Figure 10:
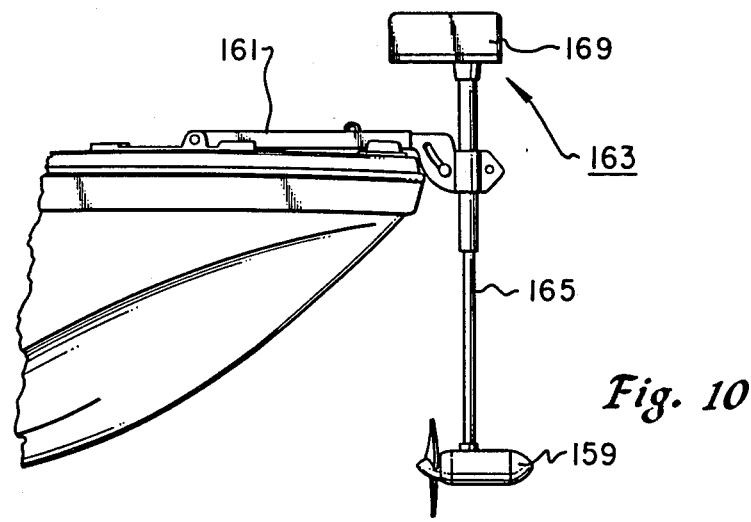
FIG. 10 is a schematic side view of a portion of a boat bow showing a trolling motor and steering mechanism of the steering control system of FIG. 9.

In another alternative embodiment, hereinafter referred to as the motorized embodiment, the steering control system of the present invention has, instead of two transom-mounted trolling motors, a single trolling motor 159 mounted on the bow portion 19 of the boat by a conventional mounting bracket 161 (see FIG. 10). The motorized embodiment includes a steering cam assembly, actuating means, and steering means 163 for changing the orientation of the trolling motor relative to the boat hull.

Figure 11:
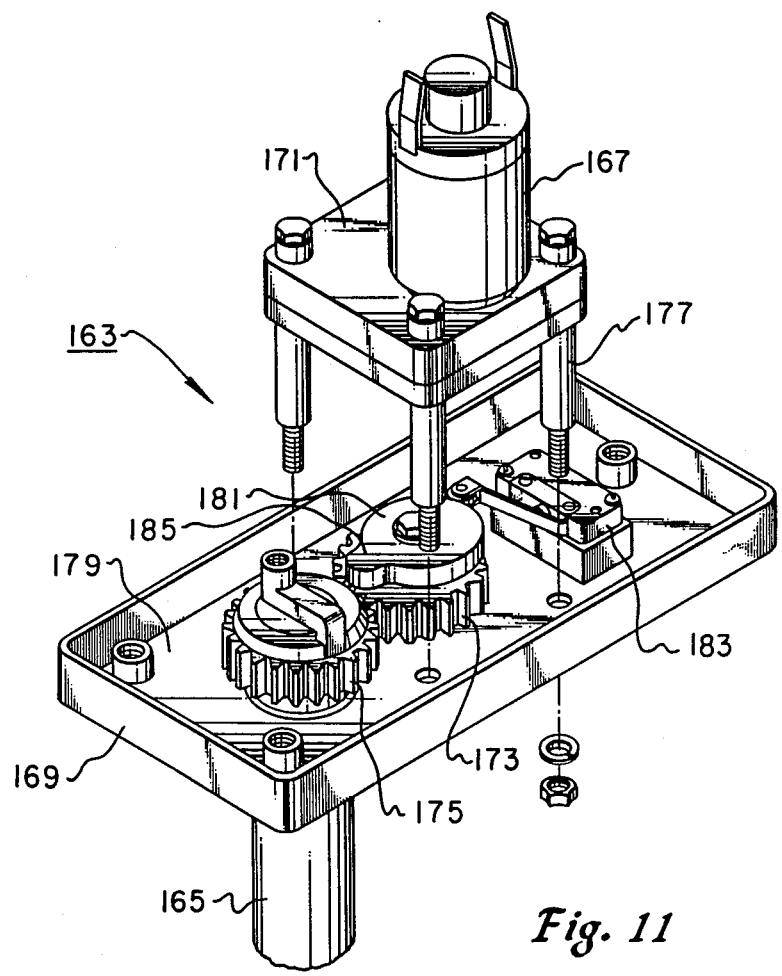
FIG. 11 is a schematic isometric exploded view of the steering means of FIG. 10.

The steering means 163, in the motorized embodiment, includes a shaft 165, a steering motor 167, drive means, and limit means (see FIG. 11). The trolling motor 159 depends from the shaft 165, which is mounted to the boat by the mounting bracket 161. The shaft 165 is free to rotate about its longitudinal axis independently of the mounting bracket 161. Furthermore, the shaft 165 is hollow to allow the passage of the electrical conductors (not shown) down to the trolling motor 159. At the upper end portion of the shaft is a small motor housing 169 that contains the steering motor 167, the drive means, and the limit means. The steering motor is a small conventional electric motor. The drive means includes a speed reducer box 171, a drive gear 173 and a driven gear 175. The input of the speed reducer box 171 is coupled to the output of the steering motor 167, the drive gear 173 is coupled to the output of the speed reducer 171, and the driven gear 175 meshes with the drive gear 173. The speed reducer box 171 is physically supported over the drive gear by four legs 177. The drive gear 173 is fixed to the motor housing floor 179 by conventional means. The driven gear 175 is unitary with the upper end portion of the shaft 165 as it protrudes slightly from the motor housing floor 179; therefore, whenever the driven gear is rotated, the shaft is also rotated.

The limit means for limiting the rotational distance of said shaft to a predetermined angular range includes a small limit cam 181 and a limit switch package 183. Circular in shape with a single saliency 185, the limit cam 181 is affixed to the upper surface of the drive gear 173 so as to turn unitarily with the drive gear. Adjacent to the limit cam 181 is the limit switch package 183. The limit switch package is of a type similar to the polarity switch packages 83 and the magnitude switch packages 85 of the swing arm embodiment. The limit switch package roller 187 rests on the circumference of the limit cam.

Figure 9:
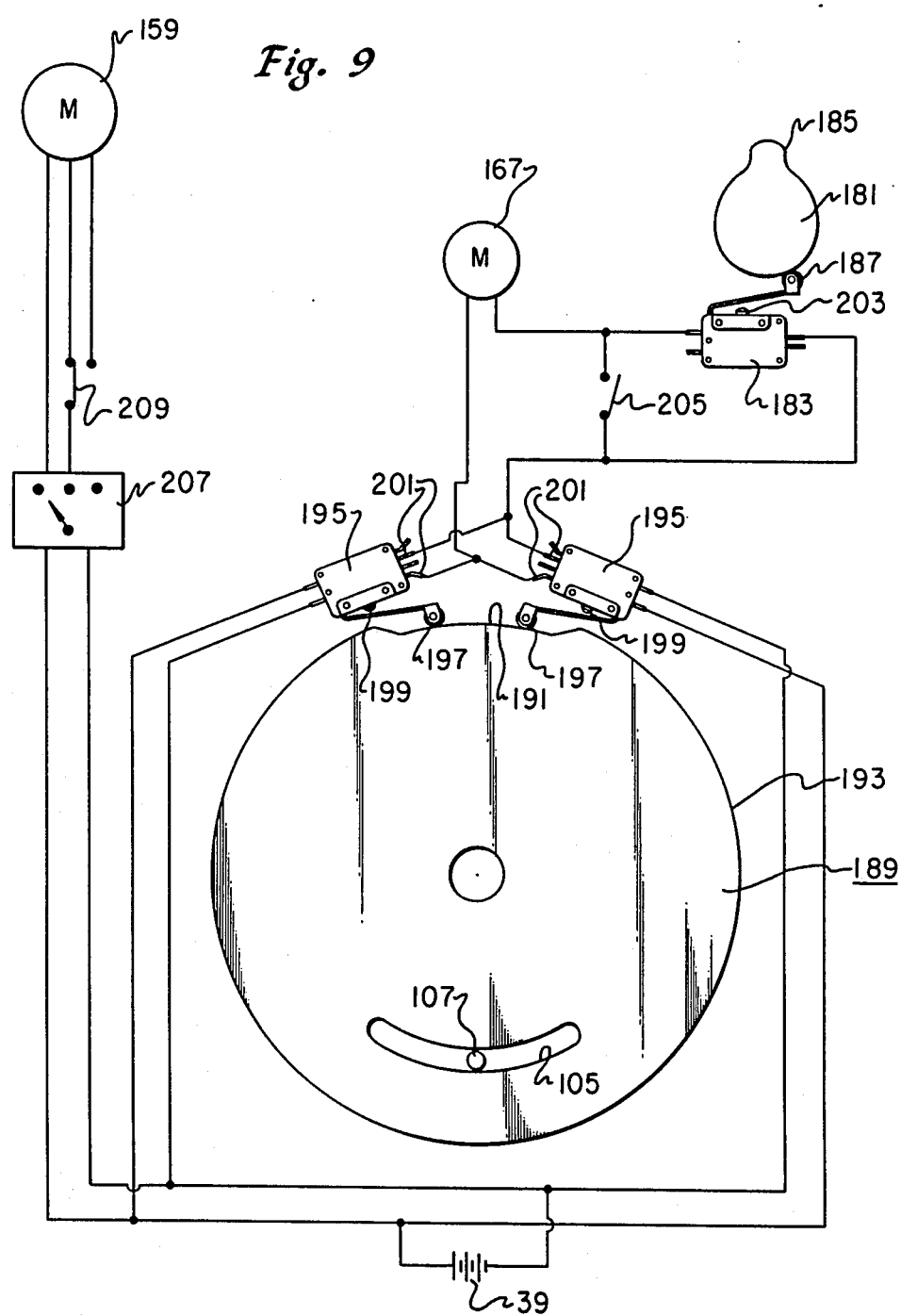
FIG. 9 is an electrical schematic view of a steering control system of the present invention, in accordance with another preferred embodiment.

The steering cam assembly for the motorized embodiment is much the same as for the swing arm embodiment, except for the actuating surfaces of the steering cam and the electrical switching means (see FIG. 9). The steering cam 189 has only a single indentation, the surface of which is the polarity control surface 191. A circumferential surface 198 is connected to the ends of the polarity control surface 191 by transitional surfaces. Polarity switch packages 195, similar to the polarity switch packages 83 of the swing arm embodiment are positioned relative to the steering cam 189 such that both rollers 197 contact the polarity control surface 191 when the steering cam is positioned to steer the boat in a straight direction. The polarity switch packages 195 are placed at a distance from the steering cam 189 such that when the rollers 197 contact the polarity control surface 191, the buttons 199 are released and when the rollers contact the circumferential surface 193, the buttons are depressed.

The electrical configuration of the motorized embodiment is somewhat different from the electrical configuration of the swing arm embodiment since the switch packages 195 do not control the trolling motor 159, but instead control the steering motor 167. The battery supply 39 is connected to both of the polarity switch packages 195. The output of the polarity switch packages are taken from the set of contacts that are normally open while the buttons are released. These output contacts 201 are connected to the steering motor such that each switch package supplies a different polarity. Because the outputs 201 of the polarity switch packages are connected together, care should be taken to avoid short circuiting the battery supply 39. One solution is to prevent the steering cam 189 from rotating any distance great enough to cause both of the polarity switch package rollers 197 to contact the circumferential surface 193 and therefore close all of the switches. This situation is prevented by appropriately sizing the arcuate length of the steering cam groove 105. The limit switch package 183 is connected in series between the steering motor 167 and the output contacts 201 of the polarity switch packages. The limit switch package 183 acts as a normally closed switch when the button 203 is released. A normally open reset switch 205 is connected in parallel with the limit switch 183. The trolling motor 159 is connected directly to the battery supply 39 via a three position switch 207 and a high speed/low speed switch 209.

The operation of the motorized embodiment will now be described. The direction of the boat is determined by the direction of the thrust provided by the trolling motor 159. As the longitudinal axis of the trolling motor 159 deviates from an alignment parallel to the boat keel, so to will the boat deviate from a straight heading. To effect a left turn, the steering cam 189 is rotated counterclockwise. This causes the right hand polarity switch package roller 197 to contact the circumferential surface 193 and connect the battery supply 39 to the steering motor 167 by closing the switches. The steering motor 167 rotates the shaft 165 and the trolling motor 159 counterclockwise. The resulting change in the direction of thrust pulls the bow to the left. When the desired heading is achieved, the steering cam 189 is rotated clockwise a sufficient distance to actuate the left hand polarity switch package 195. Reverse polarity is applied to the steering motor 167 which rotates the shaft and the trolling motor 159 clockwise. The steering cam 189 is returned to its original preactuation position when the trolling motor is once again aligned with the boat keel.

If the steering cam 189 is actuated for any significant period of time, the steering motor will continue to rotate the trolling motor 159. To prevent the electrical conductors inside of the shaft 165 from twisting, the limit cam 181 prevents the trolling motor from turning a complete circle. The limit cam 181 actuates the limit switch 183 located inside of the limit switch package and thereby opens the circuit to stop the steering motor.

Operation is restored by manually depressing the reset switch 205 until the limit switch is deactuated.

Figure 12:
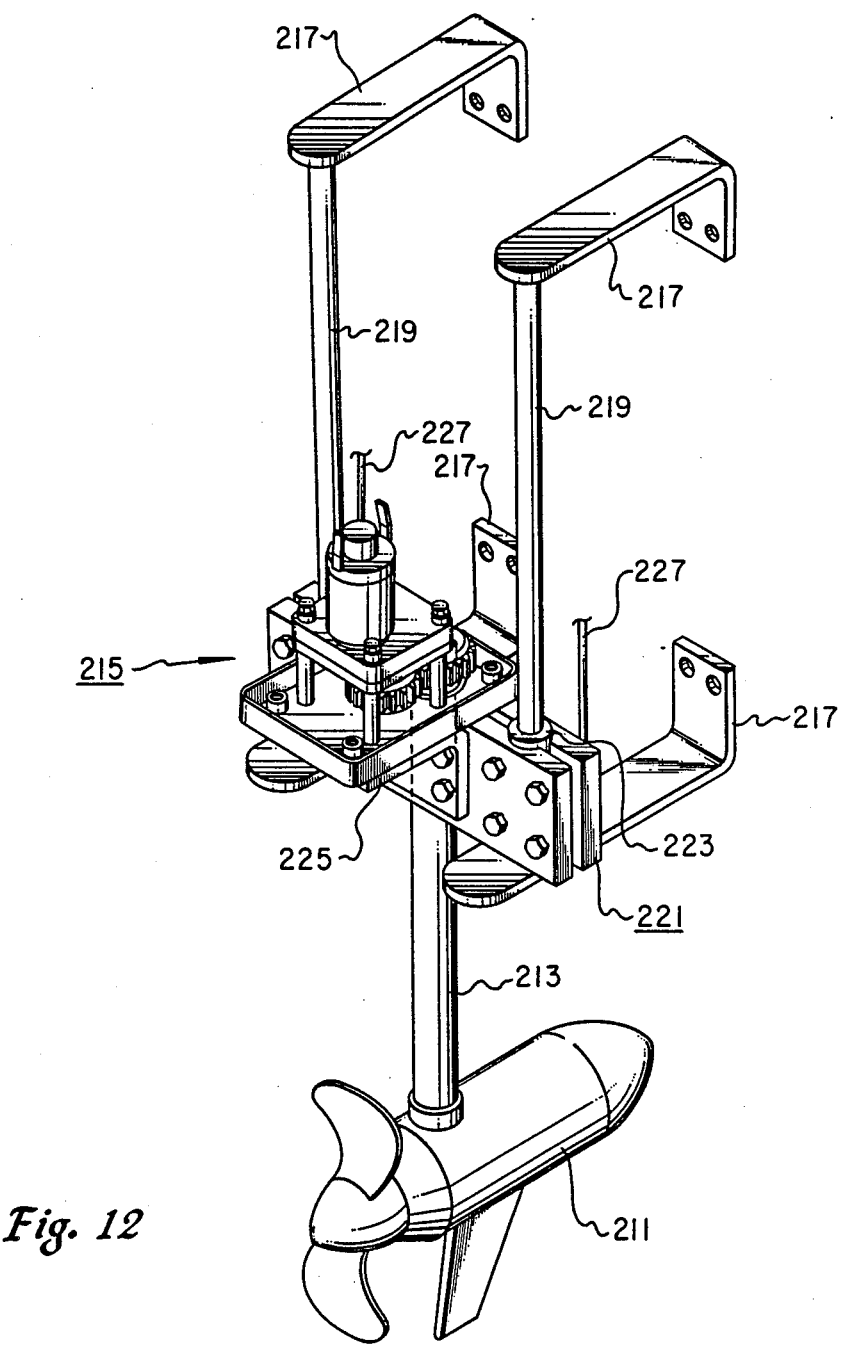
FIG. 12 is a schematic isometric view of a trolling motor and a steering mechanism of FIG. 10, for installation onto the stern of a boat.

Although the motorized embodiment of the steering control system has been described with reference to a single bow mounted trolling motor, it is clear that the motorized embodiment can be utilized with transom-mounted motors. Referring to FIG. 12, one such embodiment is shown. The trolling motor 211, shaft 213, and steering means 215 are similar to those used by the bow mounted embodiment. The difference lies in the mounting brackets 217 which incorporate two parallel rods 219 for raising and lowering the trolling motor 211 and an arm 221 that is firmly secured to the two sleeves 223 placed around the respective rods. The steering means 215 is supported on the arm 221 by an angle bracket 225. The shaft 213 from which the trolling motor 211 depends is also supported by the arm 221, but in such a manner that allows the shaft to rotate about its longitudinal axis. Two cables 227 assist in raising and lowering the trolling motor. Two trolling motors, each supported by the embodiment illustrated in FIG. 12 may be utilized on the stern of the boat, with one trolling motor on each side of the keel. The steering cam assembly controls both of the steering motors simultaneously.

Further considerations concerning the present invention will now be discussed. Although the steering control system has been described with respect to fishing boats having a secondary propulsion means, the steering control system of the present invention can obviously be used on other types of watercraft. In addition, the steering control system of the present invention can be applied to a watercraft's primary propulsion means.

The steering cam assembly is entirely portable and may be moved from place to place around the boat. The limits of portability are determined only by the length of electrical wire that connects the steering cam assembly to the remainder of the steering control system. In use, the steering cam assembly is stationarily positioned relative to the boat hull so that as the top plate is rotated, the steering cam housing remains stationary. This positioning is easily achieved by placing the steering cam assembly on the boat deck so that the bottom plate contacts the deck. Alternatively, the steering cam assembly could be placed on the boat deck so that the top plate contacts the deck.

The actuating means has been described in the preferred embodiments as a top plate. Alternative acuating means include a steering wheel or a chair which rotates the steering cam as the chair itself is rotated. In the case where the steering cam assembly is placed upon the deck with the top plate contacting the deck, the actuating means is the steering cam housing.

DESCRIPTION OF PREFERRED EMBODIMENTS (FIGS. 13–27)

Figure 13:
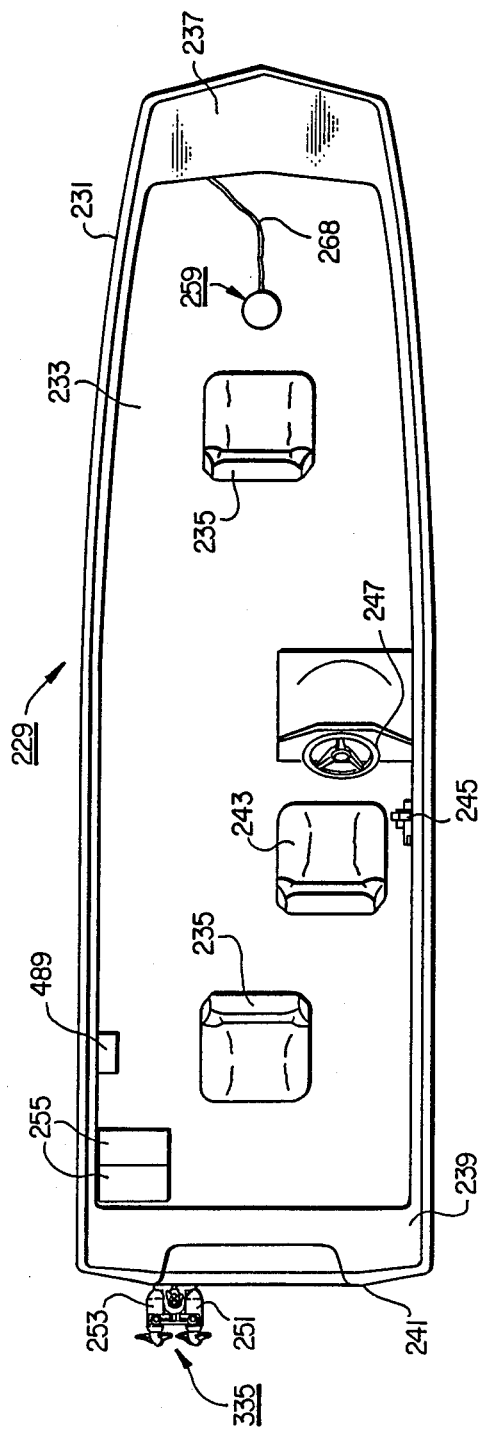
FIG. 13 is a schematic plan view of a fishing boat incorporating a speed and direction control system, including a controller and a differential steering type mounting means, of the present continuation-in-part invention.

In FIG. 13 there is shown a plan view of a typical fishing boat 229 in which a speed and direction control system, including a controller 259 and a differential steering type mounting means 335, of the present continuation-in-part invention, has been installed. There is shown the boat hull 231 and the boat deck 233. Fishing seats 235, mounted on pedestals extending above the deck 233 and capable of rotating 360°, are located in the bow and stern portions 237, 239, of the boat. A longitudinal axis extends from the bow to the stern. The boat 229 has a keel that is parallel to the boat longitudinal axis. The boat is equipped with primary and secondary propulsion means. The primary propulsion means is typically a large internal combustion engine (not shown) located on the transom 241 of the boat. The primary engine may be either an outboard type or an inboard type, although in a boat such as is illustrated, an outboard engine would be the type most commonly used. A driver's seat 243 is mounted to the deck 233 on the right or starboard side of the boat 229. Throttle and directional controls 245, 247 for the primary engine are accessible from the driver's seat 243.

The secondary propulsion means is electrical in nature and includes portions that are submergible and thus can operate in an underwater environment. In the embodiments illustrated herein, the secondary propulsion means submergible portions are trolling motors. In the particular embodiment shown in FIG. 13, there is a trolling motor mounting means unit 335 having a right (inboard) trolling motor 251 and a left (outboard) trolling motor 253. The trolling motor mounting means unit 335 can be mounted on the left and/or right side of the boat 229. The trolling motors 251, 253 have a streamlined shape so as to present a minimal amount of resistance to the water as the trolling motors travel through the water. A propeller provides propulsive thrust in a direction coaxial to the longitudinal axis of each trolling motor. The trolling motors are fixed to the boat hull 231 by mounting means, which will be described in more detail below.

The boat also has means for energizing the electrical systems on board including the trolling motors and the speed and direction control system. In the preferred embodiment, the means for energizing the electrical systems is one or more batteries 255.

The speed and direction control system of the present continuation-in-part invention will now be described. The speed and direction control system includes a controller 259, first and second electrical means and mounting means.

Figure 14:
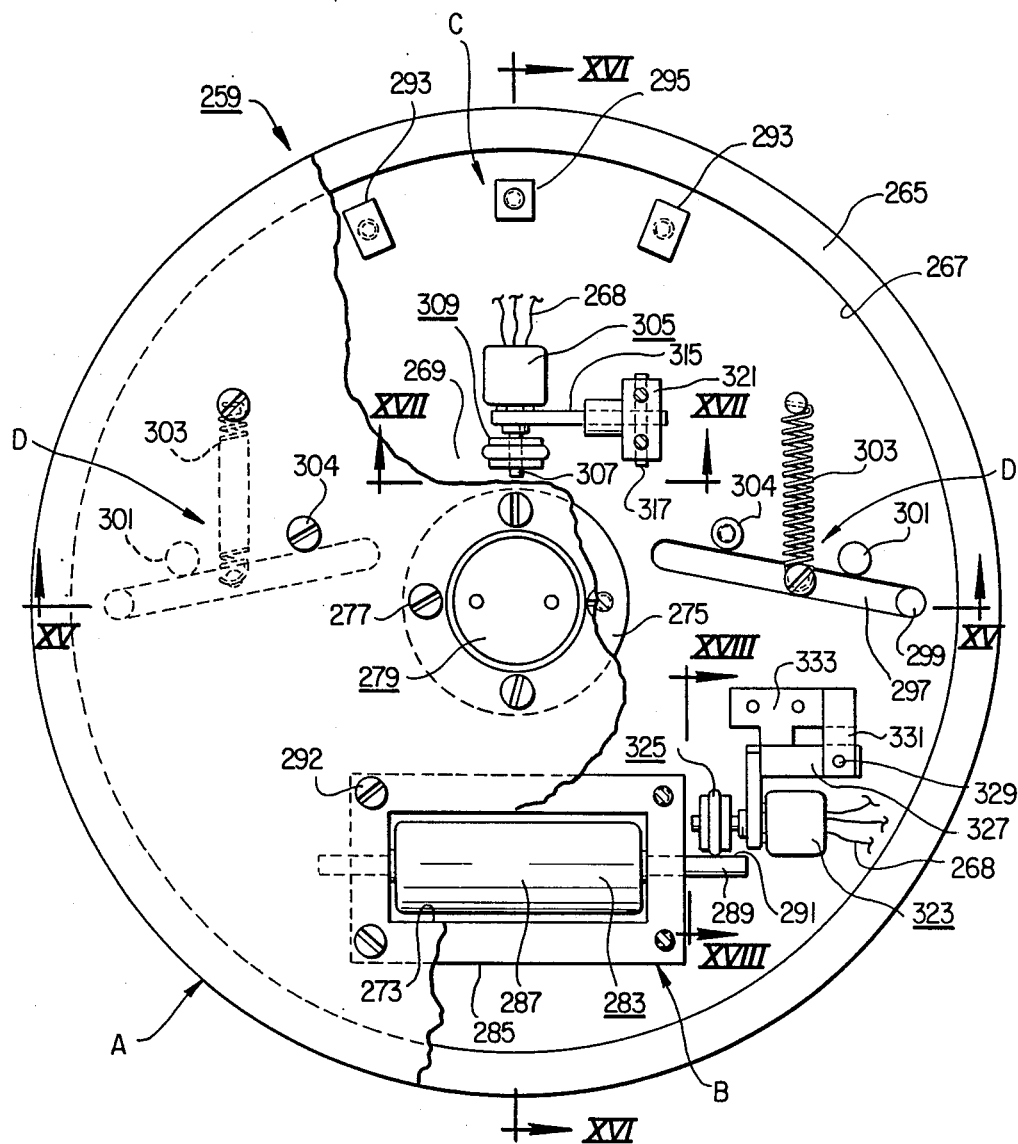
FIG. 14 is a schematic partial fragmentary plan view of a controller, in accordance with a preferred embodiment.

The controller 259 includes a steering assembly A, a speed assembly B, a limit means C and a realignment means D (see FIGS. 14–16). The steering assembly A includes a first or bottom member 261 and a second or top member 263, both of which are, in the preferred embodiment, circular plates. A short cylindrical side wall 265 is mounted to the perimeter of the upper surface of the bottom member 261 to form a shallow cavity 267. The side wall 265 has a small hole (not shown) that allows wires 268 to enter the cavity 267 from the exterior of the controller 259. The upper surface of the bottom member 261 is flat and forms a first actuating surface 269. The top member 263 is rotatably mounted to the bottom member 261 so as to cover completely the controller cavity 267. Both the top and bottom members 261, 263 have concentric circular holes 271 in their centers. The top member 263 additionally has a rectangular opening 273. Cup-shaped spacers 275, each having a short cylindrical side wall and an end wall thereby forming a shallow interior cavity, are secured to the inside surfaces of the top and bottom members by countersunk screws 277 such that the spacer end walls are adjacent to each other. The interior cavities of the spacers 275 are concentric to the circular holes 271 of the bottom and top members 261, 263. Between the end walls of the spacers 275 is a washer shaped nylon bearing 278. The respective interior cavities of the spacers 275 receive the respective heads of a nut and bolt assembly 279, while the nut and bolt shafts extend through circular holes 281 in the end walls of the spacers 275.

The nut and bolt assembly 279, the heads of which are flush with the outside surfaces of the bottom and top members 261, 263, retain the top member to the bottom member, but allow rotation of the top member 263 relative to the bottom member 261. With the exception of the speed assembly B, the outside surfaces of the top and bottom members 263, 261 are free of any projections that would interfere with placing the controller on a boat deck or operating the controller with a foot.

The speed assembly B includes a third member or speed control roller 283 and a speed control roller housing 285. The speed control roller 283 is made up of a cylinder 287 having a rod 289 located coaxially therein. The cylindrical rod 289 extends outwardly for some distance from both ends of the cylinder 287, with one end of the rod having a second actuating surface 291. The speed control roller housing 285 is a rectangular box with an open top end and is secured to the underside of the top member 263 with screws 292 such that the open top end corresponds to the rectangular opening 273 in the top member. The end walls of the speed control roller housing 285 have holes (not shown) for receiving the end portions of the rod 289. The speed control roller 283 is rotatably mounted within the speed control roller housing 285 by inserting the rod 289 through the holes in the end walls of the speed control roller housing and such that a portion of the side of the cylinder 287 extends through the top member rectangular opening 273 and such that the end portion of the rod 289 with the second actuating surface 291 extends beyond the housing. The bottom wall of the speed control roller housing 285 does not contact the bottom member 261.

The limit means C limits the angular distance traversed between the top member 263 relative to the bottom member 261 to a predetermined angular range. In the preferred embodiment the limit means C includes right and left stops 293 mounted to the upper side of the bottom member 261, and a center stop 295 mounted to the underside of the top member 263. The right and left stops 293 are located near the side wall 265 in positions subtending the desired angular range of movement of the top member 263 relative to the bottom member 261. The center stop 295 is positioned between the right and left stops 293 within the angular range. The stops 293, 295 protrude into the controller cavity 267 a sufficient distance such that the center stop 295 can contact the right and left stops 293, thereby stopping the rotation of the top member 263 relative to the bottom member 261 whenever an attempt is made to rotate the top member past the predetermined angular range.

The top member 263 is normally kept in a preactuation alignment relative to the bottom member 261 which is that alignment where the center stop 295 is centered between the right and left stops 293. The realignment means D realigns the top member 263 relative to the bottom member 261 to the preactuation alignment after the top member has been rotated relative to the bottom member. The realignment means D is located inside of the controller cavity 267 and has a set of bars 297 located on opposite sides of the nut and bolt assembly 279. Each bar 297 has one of its ends pivotally mounted to the upper surface of the bottom member 261 by conventional pivot means 299. The pivoting motion of each bar 297 towards the limit means C is limited by a bar stop 301 which is mounted to the upper surface of the bottom member 261. A helical spring 303 is provided each bar 297. One end of each spring 303 is attached to the middle portion of the respective bar 297, while the other end of each spring is attached to the bottom member 261 at positions which are nearer to the center stop 295 than to the speed assembly B. In addition, there are provided projections 304 which depend from the underside of the top member 263 a sufficient distance so as to contact the respective bars 297 and are positioned on the spring 303 side of the bars. When the controller is in the preactuation alignment, with the center stop 295 centered between the right and left stops, the respective springs 303 pull the bars 297 up against the respective stops 301. Referring specifically to FIG. 14, the operation of the realignment means D is as follows: As the top member 263 is rotated clockwise, the right spring 303 will stretch as the right projection 304 swings the right bar 297 counterclockwise. The left spring 303 is prevented from becoming entangled by the left stop 301. The top member 263 is automatically returned to the preactuation alignment by releasing it, whereupon the right spring 303 and the right bar 297 rotate the top member counterclockwise via the right projection 304.

The first and second electrical means are provided within the controller cavity 267. The first electrical means controls the direction of the boat and the second electrical means controls the speed of the boat. The control functions of the first and second electrical means will be described in more detail in conjunction with the descriptions of the mounting means. The first electrical means includes a first potentiometer 305 which is a conventional center pole potentiometer having an outwardly extending shaft 307. A rotatable member 309 is coupled to the end portion of the first potentiometer shaft 307. The rotatable member 309 is made up of a short cylindrical portion 311 which has a circumferential groove (not shown) for receiving an O-ring 313. The first potentiometer 305 is pivotally mounted to the top member 263 by way of a pivot arm 315 so that the rotatable member 309 contacts the bottom member first actuating surface 269 and therefore responds to any relative rotational movement of the first actuating surface (see also FIG. 17). One end of the pivot arm 315 is coupled to the first potentiometer 305 while the other end is supported by a pin 317 which in turn is supported by an inverted U-shaped bracket 319. The bracket 319 is mounted to the underside of the top member 263. Thus, the first potentiometer 305 can pivot up and down. A leaf spring 321 (see FIG. 17a), located between the bracket 319 and the top member 263, exerts downward force on the pivot arm 315 to insure that the O-ring 313 maintains contact with the first actuating surface 269.

The second electrical means includes a second potentiometer 323 which is also a conventional potentiometer with an outwardly extending shaft. A rotatable member 325, which is substantially similar to the first potentiometer rotatable member 309, is coupled to the end portion of the shaft of the second potentiometer 323. The second potentiometer 323 is pivotally mounted to the top member 263 by way of an L-shaped pivot arm 327 so that the O-ring of the rotatable member 325 contacts the second actuating surface 291 of the speed control roller rod 289 (see FIG. 18). The pivot arm 327 pivots about a vertical axis extending through a pin 329, which secures the pivot arm to a mounting bracket 331 and to the underside of the top member 263. A leaf spring 333 (see FIG. 18a) insures that the rotatable member 325 maintains contact with the speed control roller second actuating surface 291 by exerting force against the pivot arm 327. The speed assembly B and the second potentiometer 323 are both attached to the top member 263 so that directional control movements and speed control movements will not interfere with one another.

The electrical connections of the first and second potentiometers will be described below in connection with the mounting means.

In operation, the controller 259 is placed in a location which is convenient for the boat operator, such as near a fishing seat 235, with the controller bottom member 261 contacting the deck 233 (see FIG. 13). The operator can control the speed of the boat by rotating the speed control roller 283 with his foot. The rotation of the speed control roller 283 actuates the second potentiometer 323 by rotating the second potentiometer rotatable member 325 which in turns rotates the center wiper of the second potentiometer 323. The operator can also control the direction of the boat by rotating the top member 263 with his foot. The boat is propelled straight ahead when the speed assembly A is in the preactuation alignment. To turn the boat, the operator rotates the top member 263 from its preactuation alignment. The movement of the top member 263 actuates the first potentiometer 305 by causing the rotation of the first potentiometer rotatable member 309 which in turn rotates the center wiper of the first potentiometer 305. The operator may then remove his foot from the controller top member 263 and allow the realignment means D to return the top member to its preactuation alignment. The stop means C prevents the top member 263 from being rotated too far in order to protect the realignment means D and the potentiometer settings.

The potentiometers 305, 323 are oriented within the controller cavity 267 so as to provide for ease of use in that the control movements of the top member 263 and the speed control roller 283 correspond to the response of the boat. Thus, for example, with the operator facing the bow portion 237, rotating the top member 263 clockwise or to the right causes the boat to turn to the right. Similarly, rotating the top portion of the speed control roller 283 towards the bow portion 237 increases the speed of the boat.

The mounting means of the present continuation-in-part invention in accordance with a preferred embodiment, with particular reference to FIGS. 19 and 20, will now be described. This embodiment is sometimes hereinafter referred to as the differential steering type mounting means 335. The differential steering type mounting means includes steering means 337, upper and lower mounting brackets 339, 341 and spring return means 343.

The steering means 337 includes a pivot shaft 345 and a steering member 347. The pivot shaft 345 is mounted in a vertical orientation to the transom 241 of the boat by the upper and lower mounting brackets 339, 341. The mounting brackets 339, 341 are coupled to the end portions of the pivot shaft 345 so as to allow the pivot shaft to turn about its vertical longitudinal axis. The mounting brackets 339, 341 are mounted to the transom 241 of the boat in a conventional manner. The steering member 347 has a first straight portion 349 and a second straight portion 351 which is the perpendicular bisector of the first straight portion. The end portions of the first straight portion are coupled to the upper end portions of vertical mounting shafts 353. The right and left trolling motors 251, 253 depend from the lower end portions of the respective mounting shafts 353. The end portion of the second straight portion 351 is slidably coupled to the pivot shaft 345 such that the steering member 347 can slide along the length of the pivot shaft. The first and second straight portions 349, 351 of the steering member are made of flat plates which couple onto the respective shafts 345, 353 by clamping the shafts between two plates. The steering member plates are assembled to form the first and second straight portions by bolts 355, which aid in the clamping action, and brackets 357. In the preferred embodiment, the pivot shaft 345 is polygonal in transverse cross section rather than splined for economic reasons.

The spring return means 343 of the differential steering type mounting means 335 is located on the upper mounting bracket 339. The spring return means 343 includes a pivot shaft coupler 359, a bearing 361, right and left return plates 363, 364, a pivot shaft cam 365, a bolt 367, right and left helical springs 369, 370, a spring anchor 371 and return plate stops 373. The pivot shaft coupler 359 has a generally square lower portion 375 and a generally cylindrical upper portion 377, with both portions being integral. The square portion 375 of the pivot shaft coupler 359 is matingly inserted into the hollow upper end portion of the pivot shaft 345, while the cylindrical portion 377 receives the bearing 361, the right and left return plates 363, 364 and the pivot shaft cam 365. The upper end portion of the cylindrical portion 377 has two flat surfaces 379 for matingly receiving a similarly shaped opening 395 on the pivot shaft cam 365. In addition, the upper end portion of the cylindrical portion 375 has a threaded bore 381 for receiving the bolt 367. The right and left return plates 363, 364, which are substantially similar to one another, each have two ends, with a longitudinal axis extending between the ends. Each return plate has a circular opening 383 in one end portion for engaging the cylindrical portion 377 of the pivot shaft coupler 359, and also has smaller circular opening 385 in the other end portion for receiving an end of one of the two respective springs 369, 370. A protuberance 387 extends outwardly in a generally perpendicular manner from the longitudinal axis of each return plate 363, 364. Each protuberance 387 has a cam edge surface 389 and a stop edge surface 391, both of which converge at the tip of the protuberance. The pivot shaft cam 365 has a flat plate 393 which has an opening 395 in one end portion for matingly engaging the flat surfaces 379 of the pivot shaft coupler cylindrical portion 377. A cylindrical projection 397 is mounted in a conventional manner to the other end portion of the pivot shaft cam plate 393 such that the projection is perpendicular to the flat plate. The upper mounting bracket 339 has a circular opening 399 for receiving the bearing 361 and the cylindrical portion 377 of the pivot shaft coupler 359. A short distance away from the circular opening 399, the spring anchor 371 projects upwardly from the upper mounting bracket 339. This spring anchor 371 provides for the coupling, in a conventional manner, of the other ends of both of the springs 369, 370. Between the circular opening 399 and the spring anchor 371, short posts or stops 373 project upwardly from the upper mounting bracket 339. Washers 401 are placed between the various parts which are assembled onto the cylindrical portion 377 of the pivot shaft coupler.

To assemble the spring return means 343, the bearing 361 is inserted into the circular opening 399 of the upper mounting bracket 339. A washer is placed on the cylindrical portion 377 of the pivot shaft coupler 359 before the cylindrical portion is inserted through the bearing 361 from the underside of the upper mounting bracket 339. The square portion 375 of the pivot shaft coupler 359 matingly engages the inside of the hollow upper end portion of the pivot shaft 345. The right return plate 363, preceded by a washer, is placed on the cylindrical portion 377 of the pivot shaft coupler from the upper side of the upper mounting bracket such that the large circular opening 383 of the right return plate receives the cylindrical portion 377. The right return plate 363 is oriented on the upper mounting bracket 339 such that the rightmost stop 373 is adjacent the stop edge surface 391. The left return plate 364, preceded by a washer, is similarly assembled onto the cylindrical portion 377, with the exception of being oriented to the leftmost stop 373. Thus, the right return plate 363 can rotate clockwise from the rightmost stop and left return plate 364 can rotate counterclockwise from the leftmost stop. One end of the right spring 369 is connected to the right return plate 363 at the small circular opening 385 and the other end is connected to the spring anchor 371. The left spring 370 is similarly connected to the left return plate 364 and to the spring anchor 371. Another washer is placed on the cylindrical portion, on top of the left return plate. The pivot shaft cam 365 is assembled onto the cylindrical portion 377 such that the opening 395 matingly engages the flat surfaces 379 of the cylindrical portion 377 and the pivot shaft cam projection 397 extends downwardly towards the upper mounting bracket 339. Finally, the bolt 367, with a washer, is threaded into the cylindrical portion bore 381 to secure the assembly together. When assembled, the springs 369, 370 pull the stop edge surfaces 391 of the return plates up against the respective stops 373 and the pivot shaft cam projection 397 is located between the cam edge surfaces 389 of the return plates. With the pivot shaft cam 365 centered, the projection 397 contacts both return plate cam edge surfaces 389.

Figure 21:
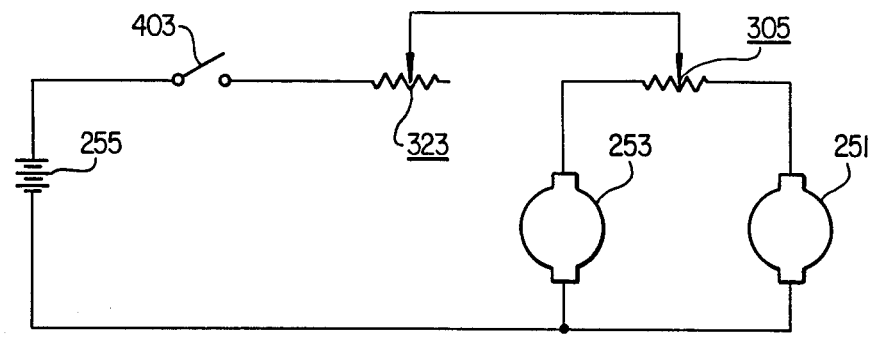
FIG. 21 is an electrical schematic showing first and second electrical means, in accordance with a preferred embodiment, for the differential steering type mounting means.

Before describing the operation of the differential steering type mounting means, the electrical connections of the first and second potentiometers will first be described with reference to FIG. 21. The second potentiometer 323 is connected in series with the trolling motors 251, 253 which are connected in parallel to one another and to the batteries 255. The first potentiometer 305 is connected between the two motors 251, 253 with the center wiper being connected to the batteries 255. An ON-OFF switch 403 is provided in series with the second potentiometer 323 to enable or disenable the first and second electrical control means.

The operation of the differential steering type mounting means will now be described with reference to FIGS. 19-21. As previously described above, to control the speed of the boat, the speed control roller 283 of the controller 259 is rotated (see FIG. 14). As the speed control roller 283 is rotated, the center wiper of the second potentiometer 323 is rotated thereby increasing or decreasing the amount of current to both trolling motors 251, 253. The change in the amount of current produces a corresponding change in the amount of propulsive thrust produced by both trolling motors 251, 253, and therefore results in a change in the speed of the boat. To turn the boat, the top member 263 of the controller 259 is rotated to rotate the center wiper of the first potentiometer 305. This action results in increasing the amount of current to one trolling motor while at the same time decreasing the amount of current to the other trolling motor. For example, to turn the boat to the right or to starboard, the top member 263 is rotated to the right or clockwise to rotate the center wiper of the first potentiometer 305. Current to the right trolling motor 251 is increased and current to the left trolling motor 253 is decreased. The right trolling motor 251 will increase its propulsive thrust output accordingly, while the left trolling motor will decrease its propulsive thrust output. This differential thrust output between the right and left trolling motors causes the steering member 347 and the pivot shaft 345 to pivot in a counterclockwise direction such that the orientation of the trolling motors relative to the keel of the boat changes with the trolling motors pointed towards the left or port side of the boat. In this orientation, the trolling motors turn the boat in the starboard direction (see FIG. 13).

The spring return means 343 assists the trolling motors 251, 253 in returning the steering member 347 and pivot shaft 345 to an alignment that will cause the boat to move straight ahead. Initially, before the turn is begun and with the trolling motors oriented relative to the boat keel so as to drive the boat straight ahead, the springs 369, 370 balance one another to maintain this forward alignment of the trolling motors. Then, as the steering member 347 and the pivot shaft 345 pivot, for example, counterclockwise to affect a right turn, the pivot shaft causes the pivot shaft cam 367 to rotate in a counterclockwise direction. The projection 397 on the pivot shaft cam 365 which contacts the left return plate cam edge surface 389 pushes the left return plate 364 in a counterclockwise direction, stretching the left spring 370. At the end of a turn, the top member 263 of the controller 259 is returned to its preactuation alignment, wherein the center wiper of the first potentiometer 305 is again rotated. The thrust outputs of the right and left trolling motors 251, 253 become balanced and the left spring 370 pulls the left return plate 364 back to the leftmost stop 373, wherein the left return plate pushes the pivot shaft cam 365 and correspondingly the pivot shaft 345 and the steering member 347 back to the forward alignment.

Figure 19:
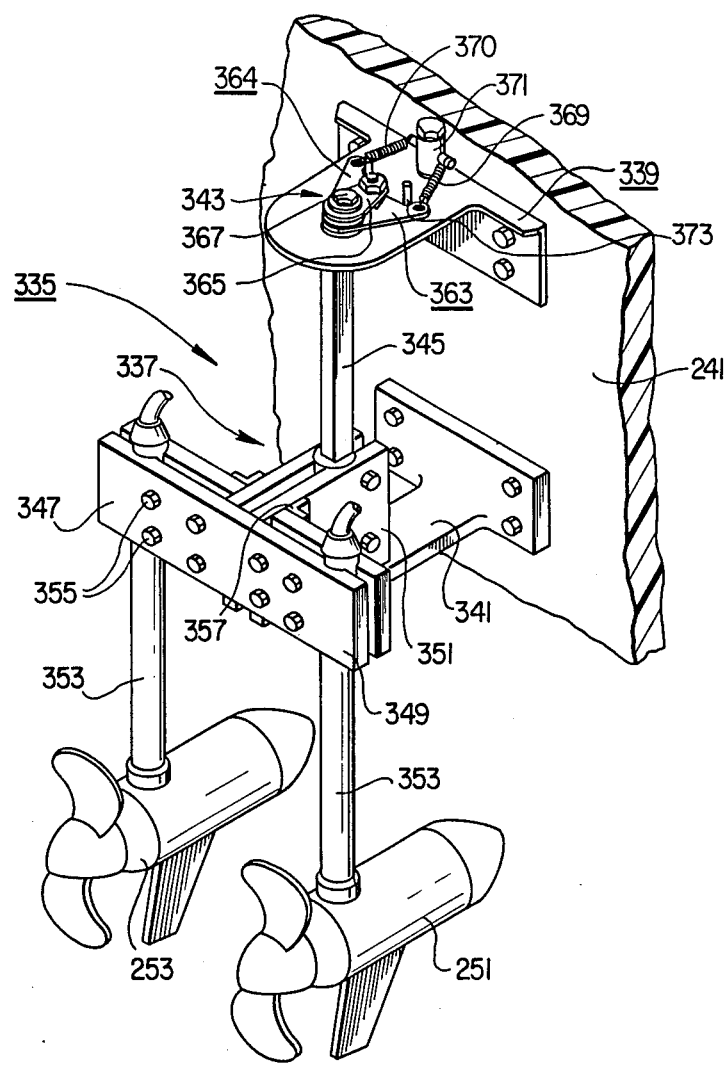
FIG. 19 is a schematic isometric view of two trolling motors mounted onto a boat hull by a differential steering type mounting means, in accordance with a preferred embodiment.
Figure 20:
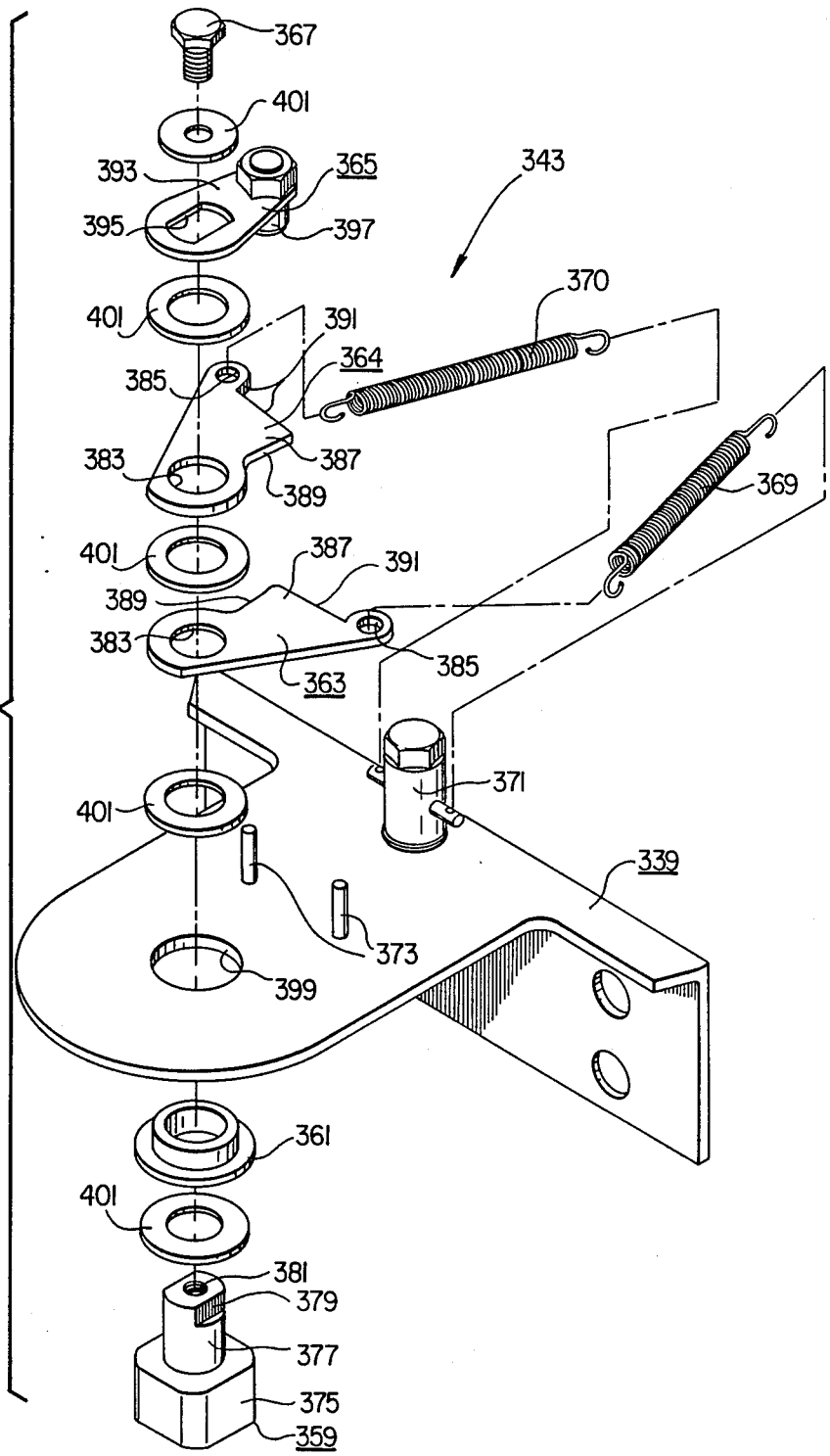
FIG. 20 is a schematic exploded isometric view of the spring return means of FIG. 19.

With the steering member 347 positioned as shown in FIG. 19 wherein the steering member is at the bottom end portion of the pivot shaft 345, the trolling motors 251, 253 are in a submerged position. The steering member 347 can be raised upwardly along the pivot shaft 345 to raise the trolling motors to an unsubmerged position.

Figure 22:
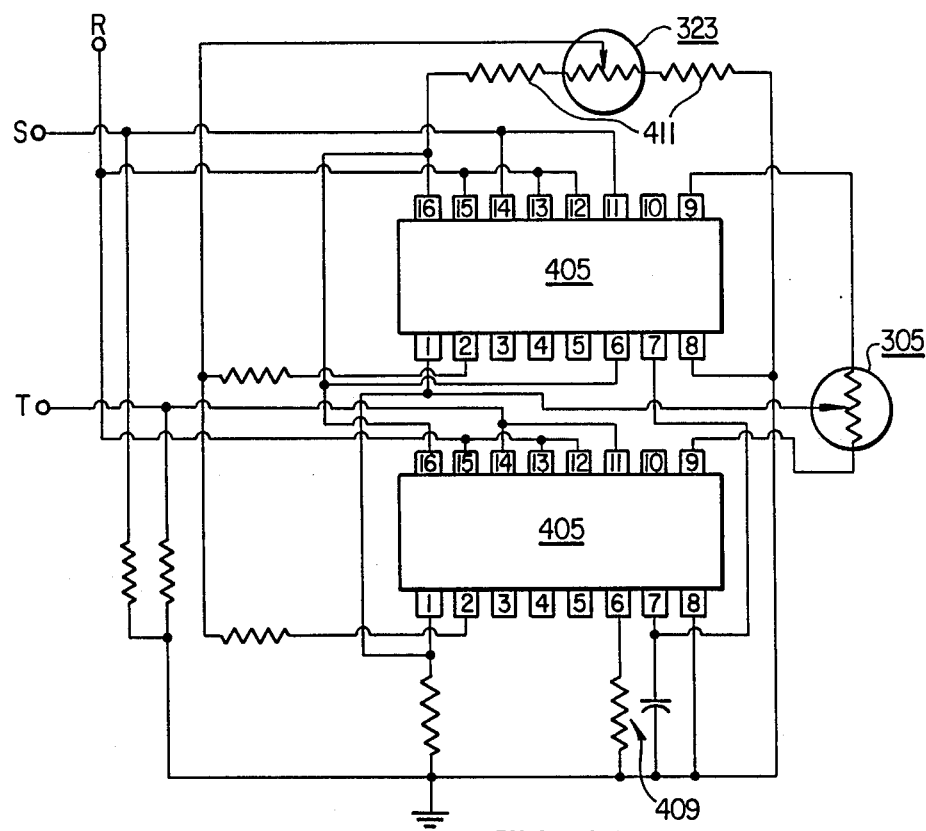
FIG. 22 is an electrical schematic showing first and second electrical means and pulse width modulators, in accordance with another embodiment, for the differential steering type mounting means.

Another embodiment of the speed and direction control system of the present continuation-in-part invention will now be described, with reference to FIGS. 22 and 22a. This embodiment of the speed and direction control system includes the controller 259, the first and second electrical means 305, 323, and the differential steering type mounting means 335, all of which have been discussed above, and in addition includes a pulse-width modulation circuit. Pulse-width modulation is utilized to conserve battery power by driving the trolling motors with a train of pulses instead of continuous d.c.

The pulse-width modulation circuit includes regulating pulse-width modulators 405 and power transistors 407. The regulating pulse-width modulators 405, which are shown in FIG. 22, provide two pulse-width modulated signals at points S and T. The regulating pulse-width modulators 405 are commercially available integrated circuit packages. The frequency of the output pulse trains is determined by a resistor-capacitor network 409. The resistor-capacitor network 409 is connected to both regulating pulse-width modulators 405 to obtain the same frequency for both output pulse trains. A voltage divider network 411 and the second potentiometer 323 provide a voltage at the center wiper of the second potentiometer that is within the control range of the regulating pulse-width modulators 405. The center wiper of the second potentiometer 323 is connected to the non-inverting inputs (pin 2) of the regulating pulse-width modulator error amplifiers. One full cycle of the second potentiometer center wiper, with the center wiper of the first potentiometer 305 in the center position, will allow the pulse train duty cycles to range from 0 to 100 percent. The output (pin 9) of the error amplifiers of the regulating pulse-width modulators 405 are connected to the first potentiometer 305. The center wiper of the first potentiometer 305 is connected to the inverting inputs (pin 1) of the error amplifiers as feedback. If the center wiper of the first potentiometer 305 is offset in one direction or the other, the output of the error amplifiers are inversely proportional. This results in a change in the duty cycles of the output pulse trains that is inversely proportional to one another.

Figure 22A:
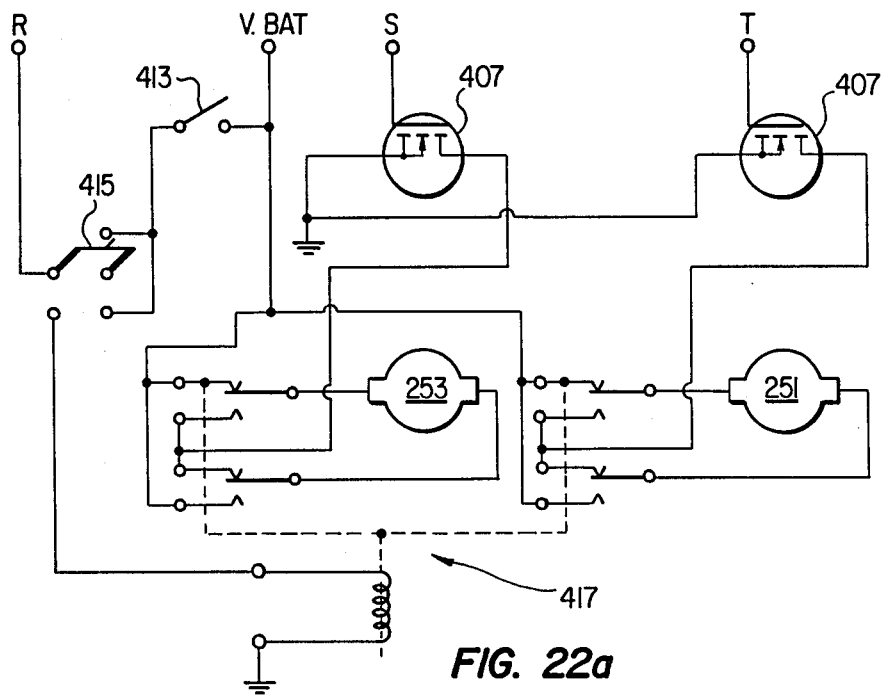
FIG. 22a is an electrical schematic showing the drive circuit associated with the circuit of FIG. 22.

The outputs S and T of the regulating pulse-width modulators 405 are connected to the gates of an array of the power transistors 407 which are T-channel MOSFET's and are commercially available components (see FIG. 22a). (The points R, S and T of FIG. 22 are connected to the respective points R, S and T of FIG. 22a). The number of power transistors that are required per trolling motor depends on the current that is required to drive each trolling motor and the rated current capacity of an individual power transistor. In FIG. 22a, only one T-channel MOSFET per trolling motor is illustrated. The current provided by the T-channel MOSFET's to the respective trolling motors is regulated by the duty cycle of the respective pulse trains. Thus, to regulate the speed of the boat, the center wiper of the second potentiometer 323 is rotated to vary in direct proportion the duty cycles of the pulse trains going to both trolling motors. For example, to increase the speed of the boat, the operator rotates the speed control roller 283 in the proper direction. This rotates the center wiper of the second potentiometer 323, which action increases the duty cycles of the pulse trains going to both trolling motors 251, 253. The trolling motors, subjected to increased current, produce more propulsive thrust, thereby increasing the speed of the boat. To turn the boat, for example, to starboard, the top member 263 of the controller 259 is rotated clockwise or to the right, wherein the center wiper of the first potentiometer 305 is rotated. This action increases the duty cycle of the pulse train going to the right trolling motor 251 and decreases the duty cycle of the pulse train going to the left trolling motor 253. The differential thrust output of the trolling motors causes the steering member 347 and the pivot shaft 345 to rotate counterclockwise as described above.

The pulse-width modulation circuit is also provided with an ON-OFF switch 413 and a forward-reverse (FWD-REV) switch 415. The ON-OFF switch 413 is a single pole, single throw switch and the FWD-REV switch 415 is a double pole, double throw switch. The switches are configured in such a manner that if the ON-OFF switch 413 is opened there will not be any voltage available to the circuit. If the ON-OFF switch 413 is closed and the FWD-REV switch 415 is in the forward position, the voltage is available to the circuit through point R and the trolling motors 251, 253 will run in a forward direction. When the ON-OFF switch 413 is closed and the FWD-REV switch 415 is in the reverse position, the voltage is available to the coil of a relay 417. When the coil of the relay 417 is energized, it reverses the polarity on the trolling motors 251, 253. The trolling motors will then run in the reverse direction.

Typical dimensions and specifications for the pulse-width modulation circuit may be stated as follows: The regulating pulse-width modulators 405 are designated by the electronics industry as 3524's. The resistor-capacitor network 409 provides a frequency of 20 KHz. The first potentiometer 305 and the second potentiometer 323 are 25 kilohms each. The resistors of the voltage divider network 411 are 100 kilohms each.

Figure 25:
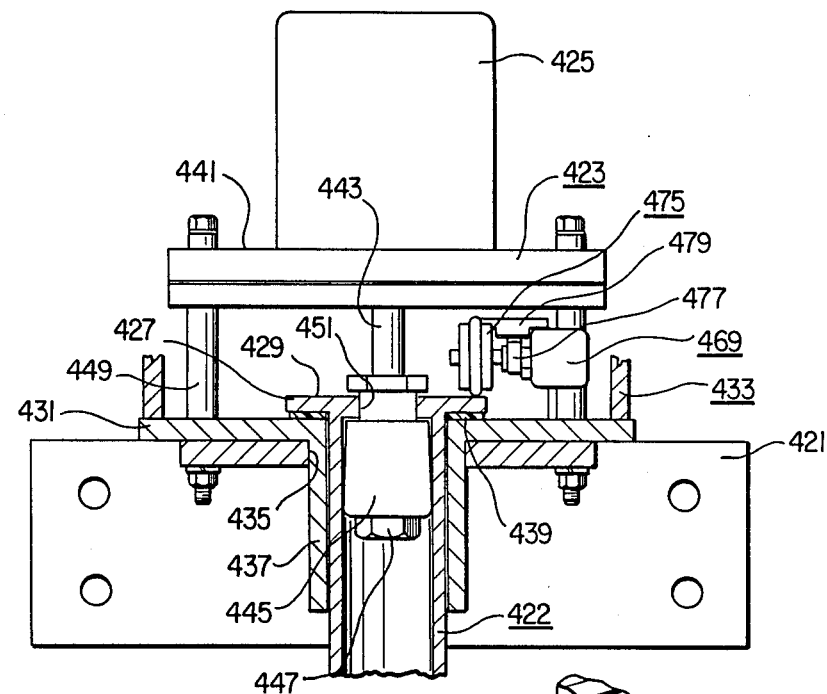
FIG. 25 is a schematic cross sectional close-up view of the steering motor and the associated drive means of FIG. 24.
Figure 24:
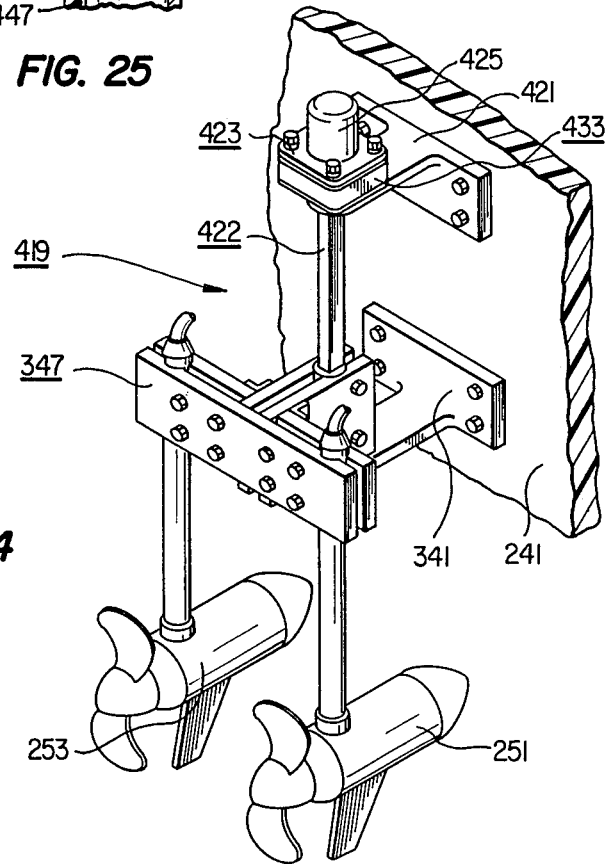
FIG. 24 is a schematic side view of two trolling motors mounted onto a boat hull by a motorized steering type mounting means, in accordance with another embodiment.

The mounting means of the present continuation-in-part invention in accordance with another embodiment, with reference to FIGS. 24 and 25, will now be described. This embodiment is sometimes hereinafter referred to as the dual trolling motor motorized steering type mounting means 419. The dual trolling motor motorized steering type mounting means 419 includes steering means and upper and lower mounting brackets 421, 341.

The steering means includes a pivot shaft 422, a steering member 347, drive means 423 and a steering motor 425. The pivot shaft 422 (with the exception of the pivot shaft upper end portion) and the steering member 347 are substantially the same as described above for the differential steering type mounting means 335. In addition, the mounting of the pivot shaft 422 to the transom 241 of the boat via the mounting brackets 421, 341 and the coupling of the right and left trolling motors 251, 253 to the steering member 347 are substantially the same as described above for the differential steering type mounting means 335. The upper end portion of the pivot shaft 422 has a horizontal flange 427 with a planar upper surface 429. The horizontal flange 427 is supported by a bottom wall 431 of a housing 433. Extending downwardly from the bottom wall 431 of the housing, through a circular hole 435 in the upper mounting bracket 421, is a short cylindrical tube 437, which receives the upper end portion of the pivot shaft 422. Between the horizontal flange 427 and the bottom wall 431 of the housing is a washer-shaped bearing 439. The drive means 423 includes a speed reducer box 441, a drive shaft 443 and a clutch mechanism 445, 447. The speed reducer box 441 is supported over the horizontal flange 427 by legs 449. The side walls of the housing 433 cover and protect the space between the bottom wall 431 and the speed reducer box 441. The drive shaft 443 depends from the speed reducer box 441, through a circular hole 451 in the center of the horizontal flange 427 and into the hollow upper end portion of the pivot shaft 422 where the drive shaft is coupled to the clutch mechanism 445, 447. The clutch mechanism has an elastomeric plug 445 that fits over the lower end of the drive shaft 443. The degree of engagement between the plug 445 and the pivot shaft 422 can be adjusted by way of a bolt 447 which extends through the bottom end of the plug and is threaded into the bottom end of the drive shaft. As the bolt 477 is tightened, the outside diameter of the plug 445 increases, causing the plug to more firmly engage the pivot shaft 422. Conversely, as the bolt 447 is loosened, the outside diameter of the plug 445 decreases, causing the plug to more loosely engage the pivot shaft 422. The steering motor 425, which is a conventional d.c. motor, is mounted atop the speed reducer box 441.

The operation of the dual trolling motorized steering type mounting means 419 is as follows: The steering motor 425, through the speed reducer box 441 and drive shaft 443, pivots the pivot shaft 422 to turn the steering member 347 and the trolling motors 251, 253. The speed reducer box 441 reduces the speed output of the steering motor. As the trolling motors turn, their orientation and thus their direction of propulsive thrust relative to the keel of the boat changes resulting in the boat turning. As for the differential steering type mounting means 335, if the pivot shaft 422 and the steering member 347 pivot in a counterclockwise direction, the trolling motors 251, 253 will point towards the port side of the boat. This orientation will cause the boat to turn to starboard. The clutch mechanism is provided to protect the trolling motors and the motorized steering type mounting means in the event of a collision between a trolling motor and an underwater obstacle. Should a trolling motor suddenly strike an underwater obstacle and twist the steering member and the pivot shaft, the clutch mechanism would slip against the pivot shaft and not transmit the movement of the pivot shaft back to the speed reducer box 441 and steering motor 425. As with the differential steering type mounting means, the steering member 347 can be moved up or down along the length of the pivot shaft 422 to raise or lower the trolling motors into unsubmerged and submerged positions.

Figure 23:
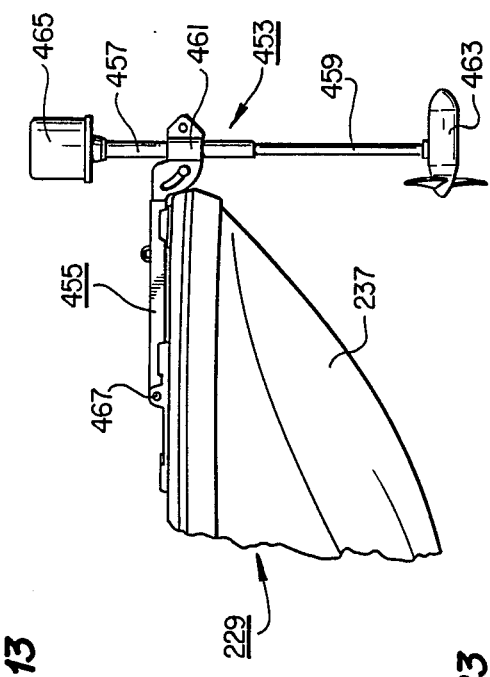
FIG. 23 is a schematic side view of a trolling motor mounted onto a boat by a motorized steering type mounting means, in accordance with a preferred embodiment.

Another embodiment of the motorized steering type mounting means is shown in FIG. 23. This embodiment is sometimes hereinafter referred to as the single trolling motor motorized steering type mounting means 453, and includes steering means and a mounting arm 455.

The steering means includes a mounting tube 457, a pivot shaft 459, drive means and a steering motor. The mounting tube 457 has a hollow interior and is coupled to the boat by the mounting arm 455. The mounting arm is conventional and secures the mounting tube 457 by way of a clamp 461. The pivot shaft 459 extends through the interior of the mounting tube 457. The pivot shaft 459 can be pivoted about its longitudinal axis within the mounting tube. A trolling motor 463 is coupled to the lower end of the pivot shaft 459. The upper end portion of the pivot shaft 459 is substantially the same as the pivot shaft 422 for the dual trolling motor motorized steering type mounting means 419. The drive means and the steering motor are located within a housing 465 which is mounted onto the upper end portion of the mounting tube 457. The mounting arm 455 pivots at its inner end 467 to allow an operator to stow the trolling motor 463 from its deployed position.

When utilizing the motorized steering type mounting means, whether for one or more trolling motors, the first electrical means which provides directional control of the boat, includes the first potentiometer 305 and in addition, includes steering motor control means. The steering motor control means includes a feedback potentiometer 469, a steering motor controller/driver circuit 471 and a steering motor drive circuit 473 (see FIGS. 25 and 26). The feedback potentiometer 469 is located within the housing 433 as shown in FIG. 25. The feedback potentiometer 469 has a rotatable member 475 that is substantially similar to the rotatable members 309, 325 of the first and second potentiometers 305, 323. The feedback potentiometer 469 is pivotally mounted to the bottom wall 431 of the housing 433 by way of a pivot arm 477 such that the O-ring of the rotatable member 475 contacts the planar upper surface 429 of the pivot shaft flange 427. A leaf spring 479 exerts downward force on the pivot arm 477 to maintain contact between the O-ring of the rotatable member 475 and the planar upper surface 429. Although the feedback potentiometer 469 shown in FIG. 25 is inside of the dual trolling motor motorized steering type mounting means housing 433, the single trolling motor motorized steering type mounting means of FIG. 23 also has a similarly configured feedback potentiometer inside of its housing 465.

Figure 26:
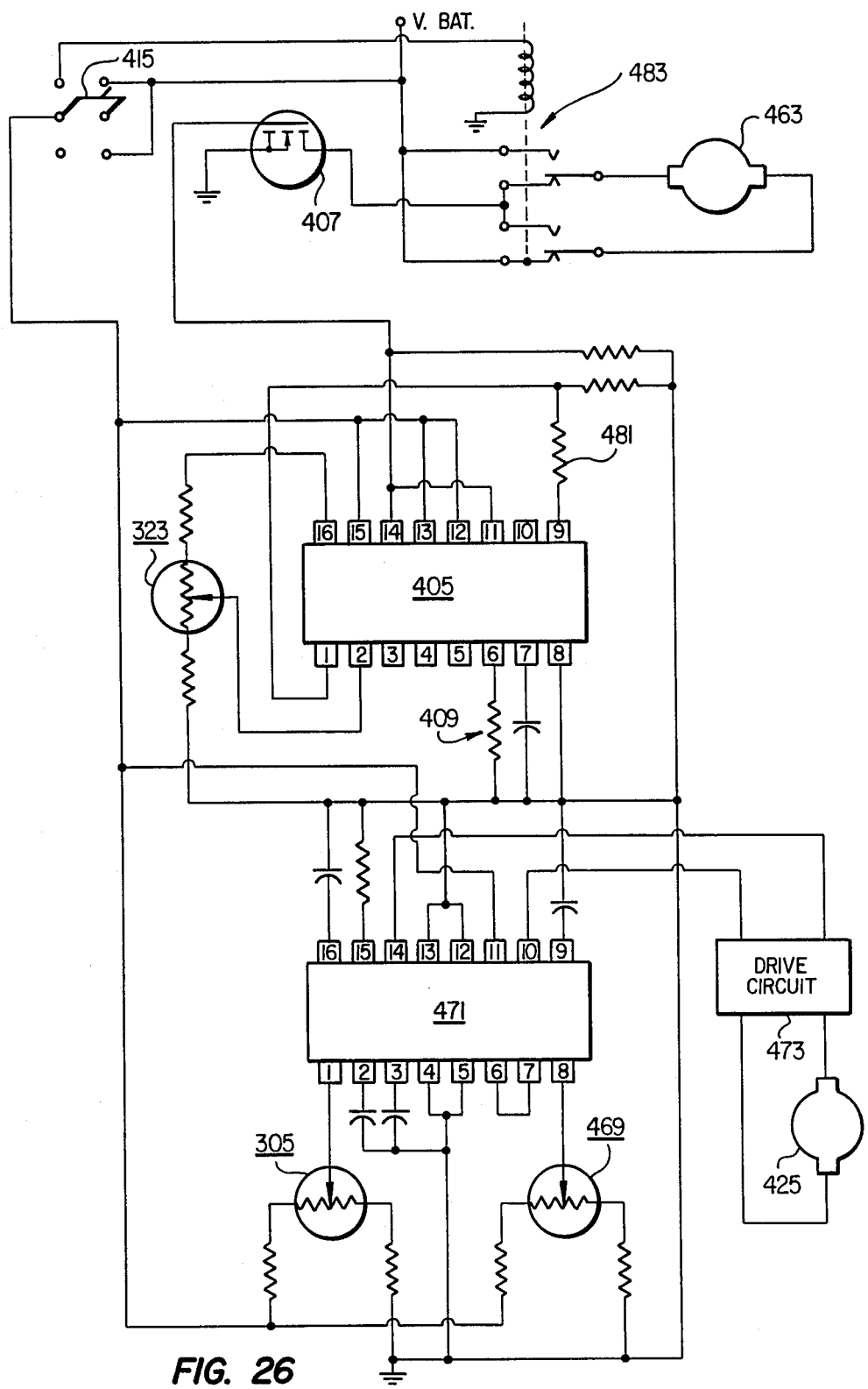
FIG. 26 is an electrical schematic showing first and second electrical means and a pulse width modulator, in accordance with a preferred embodiment for a motorized steering type mounting means.

Referring to FIG. 26, the steering motor controller/driver circuit includes a commercially available motor controller/driver integrated circuit 471. The feedback potentiometer 469 is connected to a differential input (pin 8) of the motor controller/driver 471, while the first potentiometer 305 is connected to the other differential input (pin 1) of the motor controller/driver. The outputs (pins 10 and 14) of the motor controller/driver 471 are connected, via the drive circuit 473, to the steering motor 425. The drive circuit 473 includes four discrete transistors configured in a conventional H-bridge arrangement. As long as the two inputs into the motor controller/driver 471 from the first potentiometer 305 and feedback potentiometer 469 are equal, the steering motor 425 remains unenergized. However, once the first potentiometer 305 is actuated by the rotating top member 263 of the controller 259 rotating the first potentiometer center wiper, differential inputs into the motor controller/driver 471 arise and the motor controller/driver, via the drive circuit 473, energizes the steering motor 425 with the correct polarity. The steering motor 425 then turns the pivot shaft 459 in the correct direction. The rotation of the pivot shaft actuates the feedback potentiometer 469. The steering motor 425 continues to turn the pivot shaft 459 until the center wiper of the feedback potentiometer 469 is rotated to a point where the inputs into the motor controller/driver 471 from the first potentiometer 305 and the feedback potentiometer 469 are equal, wherein the motor controller/driver de-energizes the steering motor.

Speed control of the boat is provided by a pulse-width modulation circuit, as shown in FIG. 26. The pulse-width modulation circuit of FIG. 26 is similar to the pulse-width modulation circuit of FIGS. 22 and 22a, which is used in conjunction with the differential steering type mounting means, in that a regulating pulse-width modulator 405 and a power transistor 407 are used. The circuit of FIG. 26 is for the single trolling motor motorized steering type mounting means 453, although the circuit can be modified as shown in FIGS. 22 and 22a to drive the dual trolling motor motorized steering type mounting means 419. Since only one trolling motor is used, the pulse-width modulation circuit requires only one regulating pulse-width modulator 405. The first potentiometer 305 of the pulse-width modulation circuit of FIG. 22 has been replaced by a one hundred kilohm resistor 481 in the pulse-width modulation circuit of FIG. 26. The output from the regulating pulse-width modulator is connected to the gate of an array of the power transistors 407, which are T-channel MOSFET's. The number of power transistors that are required depends on the current that is required to drive the trolling motor and the rated current capacity of an individual power transistor. A forward-reverse switch 415 and relay 483 are provided to change the polarity of the current through the trolling motor 463.

Figure 27:
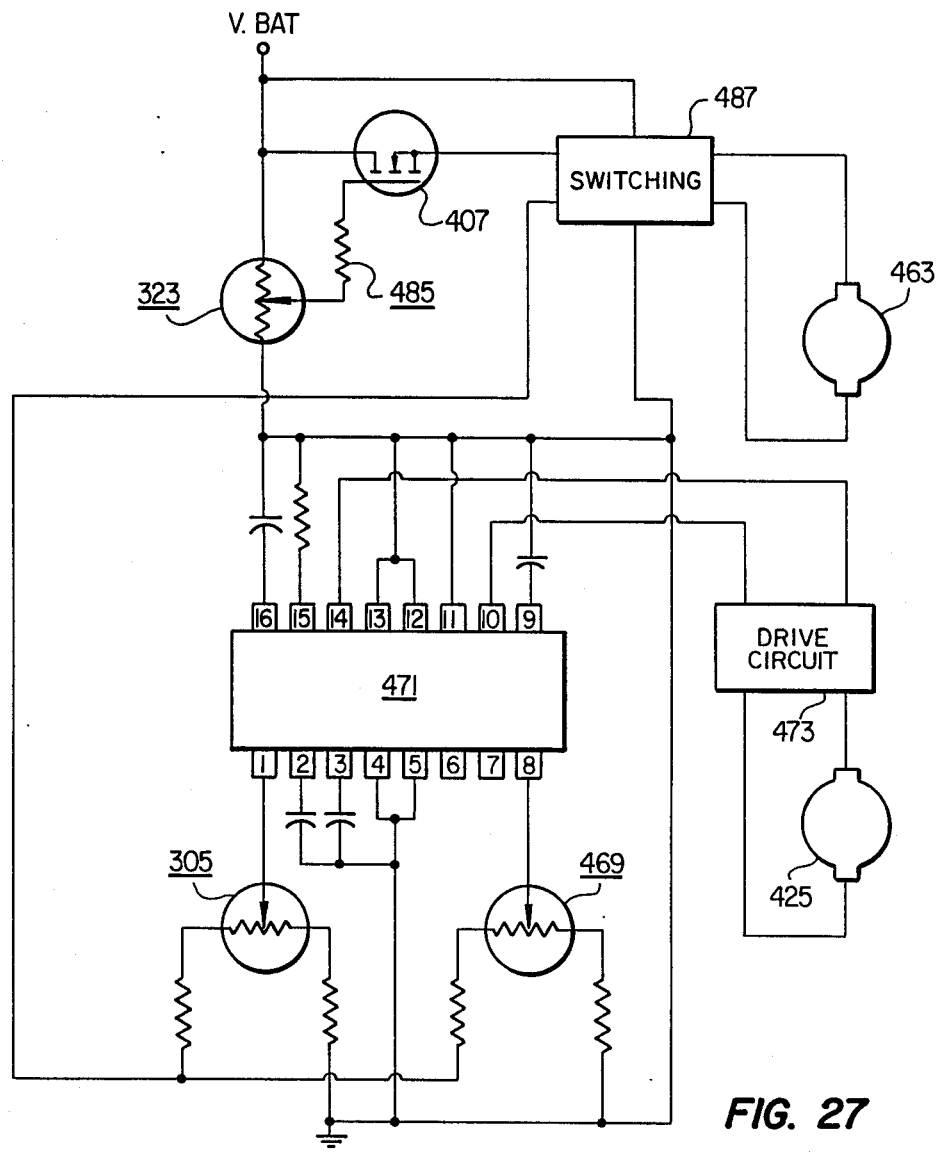
FIG. 27 is an electrical schematic showing first and second electrical means, in accordance with another embodiment, for a motorized steering type mounting means.

In FIG. 27 there is shown another circuit for the single trolling motor motorized steering type mounting means 453. The circuit of FIG. 27 includes the steering motor control means of FIG. 26, for directional control. Speed control is provided with continuous d.c. instead pulse-width modulation as in the circuit of FIG. 26. The center wiper of the second potentiometer 323 is connected to the gate of the power transistor 407, via a one hundred ohm resistor 485. As described above, the single illustrated power transistor 407 could be an array of power transistors. A forward-reverse switch and a relay are provided in a switching unit 487 to change the polarity of current going to the trolling motor 463. The circuit of FIG. 27 can be modified to drive the dual trolling motor motorized steering type mounting means 419.

Typical specifications for the circuits of FIGS. 26 and 27 may be stated as follows: The motor controller/driver integrated circuit 471 is a Motorola 73330. The first, second and feedback potentiometers 305, 323, 469 are twenty-five kilohms each. The transistors in the drive circuit 473 have the designations TIP 29 and TIP 30. The steering motor 425 is twelve volt, one-half amp d.c. motor.

Some of the aspects that are discussed with reference to the invention hereinabove described and shown in FIGS. 1–12 are also applicable to the invention hereinabove described and shown in FIGS. 13–27. One such aspect is that the steering cam assembly (the controller in this continuation-in-part application) may be positioned in a location that is convenient to the boat operator and may be foot operated to free the operator's hands for other tasks. Another such aspect is the discussion concerning the portability of the steering cam assembly. Another such aspect is the applicability of the steering control system (the speed and direction control system in this continuation-in-part application) to types of watercraft other than fishing boats and types of propulsion means other than a secondary propulsion means.

Further considerations concerning the continuation-in-part invention will now be discussed. The controller provides speed and direction controls that, from the operator's point of view, are simple and easy to use. The potentiometers inside the controller can be oriented so that the directional control movements correspond to the direction the boat moves and the speed control movements correspond to the response in the speed of the boat. The directional control has a default position, the preactuation alignment of the top member 263 of the controller, so that when the boat has turned to the desired direction, the operator can remove his foot and the controller will automatically stop turning the boat. The operator can operate the speed control and then remove his foot, whereby the speed of the boat remains constant.

The controller, when used in conjunction with the pulse-width modulation circuits, incorporates safety considerations in that the portions of the first electrical means and the second electrical means that are inside of the controller utilize low current. The larger currents required by the trolling motors are isolated from the operator using the controller by the pulse-width modulation circuits and, in the case of the steering motor, by the motor controller/driver circuit. The pulse-width modulation circuits and the motor controller/driver circuit are housed in a unit 489 adjacent to the batteries (see FIG. 13).

The center wipers of the first and second potentiometers are shown in the preferred embodiment of the controller to be indirectly driven by actuating surfaces and rotatable members. The controller may be configured to directly drive the potentiometer center wipers.

The differential steering type mounting means and the motorized steering type mounting means may be used without the controller. To control the speed and direction of a boat by either type of mounting means, the first and second potentiometers can be located in an arrangement that allows actuation of the center wipers by the boat operator.

The differential steering type mounting means and the motorized steering type mounting means may be located at positions on the boat hull other than those described above. If the trolling motors are positioned to one side of the boat keel, some adjustment in the orientation of the trolling motors relative to the boat keel may be necessary so that the boat will be propelled straight ahead when the top member of the controller is in the preactuation alignment. Two differential steering type mounting means may be used on heavy boats to provide a sufficient amount of thrust. In this case, a differential steering type mounting means would be mounted on each side of the boat.

The motorized steering type mounting means has a realignment feature that will automatically realign the pivot shaft and thus the trolling motors should a trolling motor strike an underwater object and twist the pivot shaft. As discussed above, the clutch mechanism protects the drive means and the steering motor by not transmitting the motion of the pivot shaft under these circumstances back to the drive means. Since the feedback potentiometer is actuated by the pivot shaft, any rotational movement of the pivot shaft will register in the feedback potentiometer and as a differential input into the motor controller/driver, regardless of the source of the motion.

The foregoing disclosure and the showings made in the drawings are merely illustrative of the principles of this invention and are not to be interpreted in a limiting sense.

What is claimed:

1. A controller for use by a boat operator in controlling the speed and direction of a boat propelled by electrical propulsion means, said boat having means for energizing electrical systems on said boat, said electrical system including portions of said propulsion means and portions of said controller, comprising:
    a. a steering assembly having a first member and a second member positioned relative to said first member such that said first and second members may be rotated about a fixed axis relative to each other,
    b. a speed assembly mounted adjacent one of said first or second members, having a third member which is accessible to a boat operator, said third member being movable by said boat operator relative to said steering assembly,
    c. first electrical means for controlling the direction of said boat, said first electrical means being actuated by the relative rotational movement between the first and second members, wherein when said first electrical means is actuated, said first electrical means causes said propulsion means to change the direction of said boat,
    d. second electrical means for controlling the speed of said boat, said second electrical means being actuated by the movement of the third member, wherein when said second electrical means is actuated said second electrical means changes the amount of electrical energy supplied to said propulsion means thereby changing the speed of said boat,
    e. said controller adapted to be operable by a foot of said boat operator such that the relative rotational movement between said first and second members and the movement of said third member may be imparted by the foot of said boat operator.

2. The controller of claim 1, further comprising:
    a. said speed assembly third member is rotatable relative to said steering assembly and has an actuating surface, said actuating surface being rotatable relative to said steering assembly,
    b. a rotatable member which rotates about an axis which is fixed relative to said speed assembly, said rotatable member being responsive to the rotational movement of said third member actuating surface, wherein said second electrical means is actuated by said rotatable member when said rotatable member is rotated.

3. A controller for use by a boat operator in controlling the speed and direction of a boat propelled by electrical propulsion means, said boat having means for energizing electrical systems on said boat, said electrical system including portions of said propulsion means and portions of said controller, comprising:
    a. a steering assembly having a first member and a second member positioned relative to said first member such that said first and second members may be rotated about a fixed axis relative to each other,
    b. a speed assembly mounted adjacent one of said first or second members, having a third member which is accessible to a boat operator, said third member being movable by said boat operator relative to said steering assembly,
    c. first electrical means for controlling the direction of said boat, said first electrical means being actuated by the relative rotational movement between the first and second members, wherein when said first electrical means is actuated, said first electrical means causes said propulsion means to change the direction of said boat,
    d. second electrical means for controlling the speed of said boat, said second electrical means being actuated by the movement of the third member, wherein when said second electrical means is actuated said second electrical means changes the amount of electrical energy supplied to said propulsion means thereby changing the speed of said boat,
    e. an actuating surface located on said steering assembly first member, so as to rotate relative to said second member,
    f. a rotatable member which rotates about an axis which is fixed relative to said second member, said rotatable member being responsive to the relative rotational movement of said first member actuating surface, wherein said first electrical means is actuated by said rotatable member when said rotatable member is rotated.

4. The controller of claim 3 wherein said first member actuating surface is a first actuating surface and said rotatable member which rotates about an axis which is fixed relative to said second member is a first rotational member, further comprising:

a. said speed assembly third member is rotatable relative to said steering assembly and has a second actuating surface, said second actuating surface being rotatable relative to said steering assembly, b. a second rotatable member which rotates about an axis which is fixed relative to said speed assembly, said second rotatable member being responsive to the rotational movement of said second actuating surface, wherein said second electrical means is actuated by said second rotatable member when said second rotatable member is rotated.

5. The controller of claim 4 wherein said first electrical means comprises a first potentiometer having a center wiper with said first rotatable member actuating the center wiper of said first potentiometer and said second electrical means comprises a second potentiometer having a center wiper with said second rotatable member actuating the center wiper of said second potentiometer.

6. The controller of claim 5 wherein:
a. said first member comprises a first plate and said second member comprises a second plate, said first plate being rotatably mounted to said second plate, said first and second plates having inside surfaces that define a cavity, with said first member inside surface incorporating said first actuating surface,
b. said third member is mounted substantially within said cavity,
c. said first and second potentiometers and said first and second rotatable members are located within said cavity.

7. The controller of claim 6, further comprising:
a. means for limiting the relative rotational distance traversed between said first and second members to a predetermined angular range,
b. means for realigning said second member relative to said first member to a preactuation alignment, after the actuation of said steering assembly.

8. The controller of claim 4 wherein:
a. said first member comprises a first plate and said second member comprises a second plate, said first plate being rotatably mounted to said second plate, said first and second plates having inside surfaces that define a cavity, with said first plate inside surface incorporating said first actuating surface,
b. said third member is mounted substantially within said cavity.

9. The controller of claim 4, further comprising:
a. means for limiting the relative rotational distance traversed between said first and second members to a predetermined angular range,
b. means for realigning said second member relative to said first member to a preactuation alignment, after the actuation of said steering assembly.

10. A controller for use by a boat operator in controlling the speed and direction of a boat propelled by electrical propulsion means, said boat having means for energizing electrical systems on said boat, said electrical system including portions of said propulsion means and portions of said controller, comprising:
a. a steering assembly having a first member and a second member positioned relative to said first member such that said first and second members may be rotated about a fixed axis relative to each other,
b. a speed assembly mounted adjacent one of said first or second members, having a third member which is accessible to a boat operator, said third member being movable by said boat operator relative to said steering assembly,
c. first electrical means for controlling the direction of said boat, said first electrical means being actuated by the relative rotational movement between the first and second members, wherein when said first electrical means is actuated, said first electrical means causes said propulsion means to change the direction of said boat,
d. second electrical means for controlling the speed of said boat, said second electrical means being actuated by the movement of the third member, wherein when said second electrical means is actuated said second electrical means changes the amount of electrical energy supplied to said propulsion means thereby changing the speed of said boat,
e. said first electrical means comprising a first potentiometer and said second electrical means comprising a second potentiometer.

11. A controller for use by a boat operator in controlling the speed and direction of a boat propelled by electrical propulsion means, said boat having means for energizing electrical systems on said boat, said electrical system including portions of said propulsion means and portions of said controller, comprising:
a. a steering assembly having a first member and a second member positioned relative to said first member such that said first and second members may be rotated about a fixed axis relative to each other,
b. a speed assembly mounted adjacent one of said first or second members, having a third member which is accessible to a boat operator, said third member being movable by said boat operator relative to said steering assembly,
c. first electrical means for controlling the direction of said boat, said first electrical means being actuated by the relative rotational movement between the first and second members, wherein when said first electrical means is actuated, said first electrical means causes said propulsion means to change the direction of said boat,
d. second electrical means for controlling the speed of said boat, said second electrical means being actuated by the movement of the third member, wherein when said second electrical means is actuated said second electrical means changes the amount of electrical energy supplied to said propulsion means thereby changing the speed of said boat,
e. said first member comprises a first plate and said second member comprises a second plate, said first plate being rotatably mounted to said second plate, and said first and second plates having inside surfaces that define a cavity,
f. said third member is mounted within said cavity.

12. The controller of claim 11 further comprising:
a. means for limiting the relative rotational distance traversed between said first and second members to a predetermined angular range,
b. means for realigning said second member relative to said first member to a preactuation alignment, after the actuation of said steering assembly.

13. The controller of claim 11 wherein said second plate is adapted to be placed on a deck in said boat such that said first plate can rotate about an axis which is perpendicular to said boat deck, said first plate being adapted to be foot operable.

14. A controller for use by a boat operator in controlling the speed and direction of a boat propelled by electrical propulsion means, said boat having means for energizing electrical systems on said boat, said electrical system including portions of said propulsion means and portions of said controller, comprising:
 a. a steering assembly having a first member and a second member positioned relative to said first member such that said first and second members may be rotated about a fixed axis relative to each other,
 b. a speed assembly mounted adjacent one of said first or second members, having a third member which is accessible to a boat operator, said third member being movable by said boat operator relative to said steering assembly,
 c. first electrical means for controlling the direction of said boat, said first electrical means being actuated by the relative rotational movement between the first and second members, wherein when said first electrical means is actuated, said first electrical means causes said propulsion means to change the direction of said boat,
 d. second electrical means for controlling the speed of said boat, said second electrical means being actuated by the movement of the third member, wherein when said second electrical means is actuated said second electrical means changes the amount of electrical energy supplied to said propulsion means thereby changing the speed of said boat,
 e. means for limiting the relative rotational distance traversed between said first and second members to a predetermined angular range,
 f. means for realigning said second member relative to said first member to a preactuation alignment, after the actuation of said steering assembly.

15. A speed and direction control system for a boat propelled by electrical propulsion means, said propulsion means comprising at least two submergible portions for providing directional propulsive thrust, said boat having means for energizing electrical systems on said boat, said electrical systems including portions of said propulsion means and portions of said speed and direction control system, said boat having a longitudinal axis, comprising:
 a. mounting means for mounting said submergible portions to said boat such that said submergible portions are positioned in fixed relation to one another, said mounting means having steering means for automatically varying the orientation of both of said submergible portions relative to the longitudinal axis of said boat in a manner responsive to differential thrust outputs of said submergible portions thereby varying the direction of propulsive thrust of said submergible portions relative to the longitudinal axis of said boat, wherein said steering means maintains the fixed relationship of the submergible portions to one another,
 b. first electrical means controllable by a boat operator for controlling the direction of said boat by selectively varying the amount of energy supplied by the energizing means to one of the submergible portions with respect to the other submergible portion, wherein the thrust outputs of said submergible portions become differential so as to change the direction of said boat,
 c. second electrical means controllable by a boat operator for controlling the speed of said boat by varying the amount of energy supplied by the energizing means to all of the submergible portions, wherein the thrust outputs of said submergible portions change so as to change the speed of said boat.

16. The speed and direction control system of claim 15 wherein:
 a. said submergible portions each have a mounting shaft extending upward, said mounting shafts having upper ends,
 b. said mounting means comprises a generally vertical pivot shaft,
 c. said steering means comprises a steering member, said steering member having portions which are coupled to the upper end portions of said mounting shafts and having another portion which is pivotally coupled to said pivot shaft such that said steering member pivots about said pivot shaft.

17. The speed and direction control system of claim 16 wherein said steering member comprises a first straight portion, the ends of which are coupled to the respective mounting shafts, and a second straight portion which is a perpendicular bisector of said first straight portion, with one end of said second straight portion being coupled to said first straight portion and the other end of said second straight portion being pivotally coupled to said pivot shaft.

18. The speed and direction control system of claim 17 wherein said mounting means further comprises spring means for assisting said submergible portions in returning said steering member to an alignment that will cause said boat to move straight ahead, after said steering member has been pivoted to an alignment that causes said boat to move in a turning manner.

19. The speed and direction control system of claim 18 wherein said pivot shaft is of sufficient length so as to allow the movement of said steering member along the length of said pivot shaft such that said submergible portions can be raised from a submerged position to an unsubmerged position and lowered from the unsubmerged position into the submerged position.

20. The speed and direction control system of claim 17 wherein said pivot shaft is of sufficient length so as to allow the movement of said steering member along the length of said pivot shaft such that said submergible portions can be raised from a submerged position to an unsubmerged position and lowered from the unsubmerged position into the submerged position.

21. The speed and direction control system of claim 16 wherein said mounting means further comprises spring means for assisting said submergible portions in returning said steering member to an alignment that will cause said boat to move straight ahead, after said steering member has been pivoted to an alignment that causes said boat to move in a turning manner.

22. The speed and direction control system of claim 21 wherein said first electrical means comprises a first potentiometer and said second electrical means comprises a second potentiometer.

23. The speed and direction control system of claim 22 further comprising pulse-width modulators that provide a train of electrical pulses to each of said submergible portions, wherein said second electrical means controls the speed of said boat by modulating in direct proportion all of the pulse trains, and wherein said first electrical means controls the direction of said boat by modulating in inverse proportion the pulse train provided to one of the submergible portions with respect to the pulse train provided to the other submergible portion.

24. The speed and direction control system of claim 16 wherein said first electrical means comprises a first potentiometer and said second electrical means comprises a second potentiometer.

25. The speed and direction control system of claim 24 further comprising pulse-width modulators that provide a train of electrical pulses to each of said submergible portions, wherein said second electrical means controls the speed of said boat by modulating in direct proportion all of the pulse trains, and wherein said first electrical means controls the direction of said boat by modulating in inverse proportion the pulse train provided to one of the submergible portions with respect to the pulse train provided to the other submergible portion.

26. The speed and direction control system of claim 16 wherein said pivot shaft is of sufficient length so as to allow the movement of said steering member along the length of said pivot shaft such that said submergible portions can be raised from a submerged position to an unsubmerged position and lowered from the unsubmerged position into the submerged position.

27. The speed and direction control system of claim 15 wherein said first electrical means comprises a first potentiometer and said second electrical means comprises a second potentiometer.

28. The speed and direction control system of claim 27 further comprising pulse-width modulators that provide a train of electrical pulses to each of said submergible portions, wherein said second electrical means controls the speed of said boat by modulating in direct proportion all of the pulse trains, and wherein said first electrical means controls the direction of said boat by modulating in inverse proportion the pulse train provided to one of the submergible portions with respect to the pulse train provided to the other submergible portion.

29. The speed and direction control system of claim 15 further comprising pulse-width modulators that provide a train of electrical pulses to each of said submergible portions, wherein said second electrical means controls the speed of said boat by modulating in direct proportion all of the pulse trains, and wherein said first electrical means controls the direction of said boat by modulating in inverse proportion the pulse train provided to one of the submergible portions with respect to the pulse train provided to the other submergible portion.

30. A speed and direction control system for a boat propelled by electrical propulsion means, said propulsion means comprising a submergible portion for providing directional propulsive thrust, said boat having means for energizing electrical systems on said boat, said electrical systems including portions of said propulsion means and portions of said speed and direction control system, said boat having a longitudinal axis, comprising:
  a. mounting means for mounting said submergible portion to said boat, said mounting means having steering means for automatically varying the orientation of said submergible portion relative to the longitudinal axis of said boat thereby varying the direction of propulsive thrust of said submergible portion relative to the longtitudinal axis of said boat, said steering means comprising steering motor means for rotating said submergible portion,
  b. first electrical means controllable by a boat operator for controlling the direction of said boat by controlling the energy supplied by the energizing means to said steering motor means, wherein said steering motor means rotates said submergible portion so as to change the direction of said boat,
  c. second electrical means controllable by a boat operator for controlling the speed of said boat by varying the amount of energy supplied by the energizing means to said submergible portion, wherein the thrust output of said submergible portion changes so as to change the speed of said boat.

31. The speed and direction control system of claim 30 wherein said steering means further comprises:
  a. a generally vertical rotatable shaft having two ends, the lower end of which is coupled to said submergible portion, said shaft having a longitudinal axis extending between said ends,
  b. drive means positioned adjacent the upper end of said shaft for rotating said shaft about its longitudinal axis,
  c. wherein said steering motor means rotates said vertical shaft via said drive means.

32. The speed and direction control system of claim 31 wherein said drive means comprises slip clutch means for coupling said motor means to said rotatable shaft upper end.

33. The speed and direction control system of claim 31 wherein said first electrical means comprises a first potentiometer and said second electrical means comprises a second potentiometer.

34. The speed and direction control system of claim 31 further comprising a pulse-width modulator that provides a train of electrical pulses to said submergible portion, wherein said second electrical means controls the speed of said boat by modulating the pulse train.

35. The speed and direction control system of claim 30 wherein:
  a. said propulsion means comprises two submergible portions,
  b. said submergible portions each have a mounting shaft extending upward, said mounting shafts having upper ends,
  c. said steering means further comprises:
    i. a generally vertical rotatable shaft having two ends, said shaft having a longitudinal axis extending between said ends,
    ii. a steering member having portions which are coupled to the upper end portions of said mounting shafts and having another portion which is coupled to said rotatable shaft such that said steering member rotates in unison with said rotatable shaft,
    iii. drive means positioned adjacent the upper end of said vertical rotatable shaft for rotating said vertical rotatable shaft about its longitudinal axis,
    iv. wherein said steering motor means rotates said vertical rotatable shaft via said drive means.

36. The speed and direction control system of claim 35 wherein said drive means comprises slip clutch means for coupling said motor means to said rotatable shaft upper end.

37. The speed and direction control system of claim 36 wherein said rotatable shaft is of sufficient length so as to allow the movement of said steering member along the length of said rotatable shaft such that said submergible portion can be raised from a submerged position to an unsubmerged position and lowered from the unsubmerged position into the submerged position.

38. The speed and direction control system of claim 35 wherein said rotatable shaft is of sufficient length so as to allow the movement of said steering member along the length of said rotatable shaft such that said submergible portion can be raised from a submerged position to an unsubmerged position and lowered from the unsubmerged position into the submerged position.

39. The speed and direction control system of claim 35 wherein said first electrical means comprises a first potentiometer and said second electrical means comprises a second potentiometer.

40. The speed and direction control system of claim 35 further comprising pulse-width modulators that provide a train of electrical pulses to each of said submergible portions, wherein said second electrical means controls the speed of said boat by modulating in direct proportion all of the pulse trains.

41. The speed and direction control system of claim 30 wherein said first electrical means comprises a first potentiometer and said second electrical means comprises a second potentiometer.

42. The speed and direction control system of claim 30 further comprising a pulse-width modulator that provides a train of electrical pulses to said submergible portion, wherein said second electrical means controls the speed of said boat by modulating the pulse train.

* * * * *